United States Patent
Buaszczyk et al.

(10) Patent No.: US 12,263,628 B2
(45) Date of Patent: *Apr. 1, 2025

(54) MULTILAYER FILMS AND ARTICLES COMPRISING THE SAME

(71) Applicant: Dow Global Technologies LLC, Midland, MI (US)

(72) Inventors: Gianna Buaszczyk, Sao Paulo (BR); Bruno Cesar De Moraes Barbosa, Sao Paulo (BR); Nicolas C. Mazzola, Pearland, TX (US); Rahul Sharma, Pearland, TX (US); Ronald Wevers, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/041,106

(22) PCT Filed: Oct. 4, 2021

(86) PCT No.: PCT/US2021/053346
§ 371 (c)(1),
(2) Date: Feb. 9, 2023

(87) PCT Pub. No.: WO2022/093488
PCT Pub. Date: May 5, 2022

(65) Prior Publication Data
US 2023/0264404 A1   Aug. 24, 2023

Related U.S. Application Data

(60) Provisional application No. 63/107,890, filed on Oct. 30, 2020.

(51) Int. Cl.
*B29C 48/08* (2019.01)
*B29C 48/00* (2019.01)
(Continued)

(52) U.S. Cl.
CPC .......... *B29C 48/08* (2019.02); *B29C 48/022* (2019.02); *B32B 27/08* (2013.01); *B32B 27/32* (2013.01);
(Continued)

(58) Field of Classification Search
None
See application file for complete search history.

(56) References Cited

U.S. PATENT DOCUMENTS 3,788,199 A    1/1974  Sato et al.
2016/0060425 A1  3/2016  Falla et al.

FOREIGN PATENT DOCUMENTS

EP          2106421 B1 *  3/2012  ............... C08J 5/18
WO       2016/145549      9/2016
(Continued)

OTHER PUBLICATIONS

Langhe et al., Manufacturing and Novel Applications of Multilayer Polymer Films, Elsevier. (Year: 2016).*
(Continued)

*Primary Examiner* — Ramsey Zacharia
(74) *Attorney, Agent, or Firm* — Jacob R. Graham

(57) ABSTRACT

The present invention relates to multilayer films. In one aspect, a multilayer film comprises a first polyethylene composition having a density of at least 0.965 g/cm³ and as further described herein and a second polyethylene composition having a density of 0.924 g/cm³ to 0.936 g/cm³ and as further described herein, wherein the multilayer film comprises 40 weight percent or less of the first polyethylene composition based on the total weight of the multilayer film.

7 Claims, 2 Drawing Sheets

(51) Int. Cl.
  *B32B 27/08*  (2006.01)
  *B32B 27/32*  (2006.01)
  *B29K 23/00*  (2006.01)
  *B29K 103/04* (2006.01)
(52) U.S. Cl.
  CPC ............... *B29K 2023/0625* (2013.01); *B29K 2023/0633* (2013.01); *B29K 2103/04* (2013.01); *B32B 2250/246* (2013.01)

(56) References Cited

FOREIGN PATENT DOCUMENTS

| WO | 2020/198195 | 10/2020 |
| WO | 2020/223688 | 11/2020 |
| WO | 2021/026135 | 2/2021 |
| WO | 2021/242384 | 12/2021 |

OTHER PUBLICATIONS

PCT/US2021/053346, International Search Report and Written Opinion with a mailing date of Jan. 12, 2022.

* cited by examiner

MULTILAYER FILMS AND ARTICLES COMPRISING THE SAME

FIELD

The present invention relates to multilayer films, and to articles comprising such films.

INTRODUCTION

Flexible packaging film structures are often formed of multiple types of polymeric materials including, for example, polyethylene, polypropylene, ethylene vinyl alcohol, polyethylene terephthalate, polyamide and others. Such materials are typically combined to achieve a balance of properties that are beyond the reach of a single material type. However, due to the dissimilarity of these materials, the final package is typically not easy to recycle. Thus, there is also a movement towards single component structures (e.g., all polyethylene structures) to improve the recyclability profile. In the case of all polyethylene structures, for example, certain performance metrics (e.g., mechanical properties) will need to be enhanced to maintain the level of performance expected of these structures when formed from different polymeric materials, while improving recyclability.

Often, in designing films for packaging and other application, an improvement in one property of a film may result in a decrease in another property of a film. For example, the use of polyethylenes having lower densities may improve some mechanical properties (e.g., dart), but decrease other properties such as secant modulus and/or barrier properties.

It would be desirable to have new multilayer films comprising different polyethylenes that provide an improved balance of properties.

SUMMARY

The present invention provides multilayer films that include a combination of polyethylene compositions and that have desirable and/or improved properties. In some embodiments, multilayer films of the present invention provide improved dart while also providing higher modulus and/or higher gas barrier properties. In some embodiments, for example, the multilayer films can surprisingly incorporate a higher density polyethylene to provide a higher overall film density while also increasing the dart performance.

In one aspect, a multilayer film comprises:
(a) a first polyethylene composition that comprises:
   (1) from 25 to 37 percent by weight of a first polyethylene fraction having a density in the range of 0.935 to 0.947 g/cm$^3$ and a melt index ($I_2$) of less than 0.1 g/10 minutes; and
   (2) from 63 to 75 percent by weight of a second polyethylene fraction; and
wherein the first polyethylene composition has less than 0.10 branches per 1,000 carbon atoms when measured using $^{13}$C NMR, wherein the density of the first polyethylene composition is at least 0.965 g/cm$^3$, and wherein the melt index ($I_2$) of the first polyethylene composition is 0.5 to 10 g/10 minutes; and
(b) a second polyethylene composition that comprises:
   (1) a first polyethylene fraction having a single peak in a temperature range of 45° C. to 87° C. in an elution profile via improved comonomer composition distribution (iCCD) analysis method, wherein a first polyethylene area fraction is an area in the elution profile beneath the single peak of the first polyethylene fraction between 45 and 87° C.; and
   (2) a second polyethylene fraction having a single peak in a temperature range of 95° C. to 120° C. in the elution profile via iCCD analysis method and wherein a second polyethylene area fraction is an area in the elution profile beneath the single peak of the second polyethylene fraction between 95° C. and 120° C.;
wherein the second polyethylene composition has a density of 0.924 g/cm$^3$ to 0.936 g/cm$^3$ and a melt index ($I_2$) of 0.25 g/10 minutes to 2.0 g/10 minutes, wherein the second polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.;
wherein the multilayer film comprises 40 weight percent or less of the first polyethylene composition based on the total weight of the multilayer film. In some embodiments, the first polyethylene composition and the second polyethylene composition are in different layers of the multilayer film. In some embodiments, at least one layer of the multilayer film comprises the first polyethylene composition and the second polyethylene composition.

In some embodiments, an outer layer of the multilayer film comprises a third polyethylene composition, the third polyethylene composition comprising:
(a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C. and wherein the first polyethylene fraction area comprises from 25% to 65% of the total area of the elution profile;
(b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and
(c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and
wherein the third polyethylene composition has a density of 0.880 g/cm$^3$ to 0.910 g/cm$^3$, a melt index ($I_2$) of 0.50 g/10 minutes to 6.0 g/10 minutes, and a zero shear viscosity ratio of less than 2.0.

The present invention also relates to articles. In one aspect, an article comprises any of the inventive multilayer films disclosed herein.

These and other embodiments are described in more detail in the Detailed Description.

BRIEF DESCRIPTION OF THE DRAWINGS

For the purpose of illustrating the presently disclosed embodiments, there is shown in the drawings a form that is exemplary; it being understood, however, that these embodiments are not limited to the precise arrangements and instrumentalities shown.

DETAILED DESCRIPTION

Figure 1:
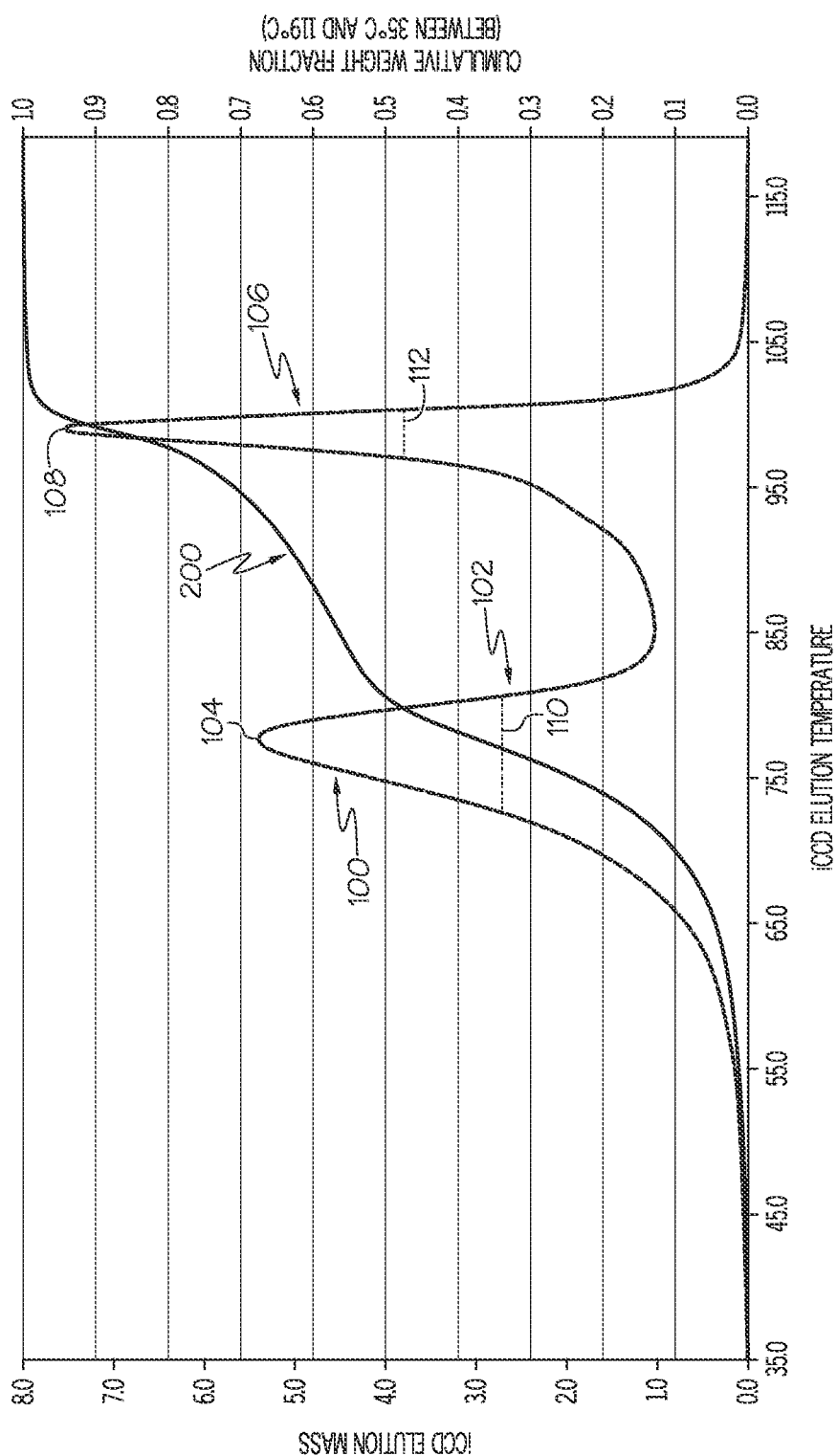
FIG. 1 schematically depicts an iCCD elution profile, according to one or more embodiments presently described.

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer as defined hereafter, and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "homopolymer," as used herein, refers to polymers prepared from only one type of monomer with the understanding that trace amounts of impurities can be incorporated into the polymer structure.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm³.

The term "LLDPE", includes both resin made using the traditional Ziegler-Natta catalyst systems and chromium-based catalyst systems as well as single-site catalysts, including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm³. "MDPE" is typically made using chromium or Ziegler-Natta catalysts or using single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy), and typically have a molecular weight distribution ("MWD") greater than 2.5.

The term "HDPE" refers to polyethylenes having densities greater than about 0.935 g/cm³ and up to about 0.980 g/cm³, which are generally prepared with Ziegler-Natta catalysts, chrome catalysts or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy).

The term "ULDPE" refers to polyethylenes having densities of 0.855 to 0.912 g/cm³, which are generally prepared with Ziegler-Natta catalysts, chrome catalysts, or single-site catalysts including, but not limited to, substituted mono- or bis-cyclopentadienyl catalysts (typically referred to as metallocene), constrained geometry catalysts, phosphinimine catalysts & polyvalent aryloxyether catalysts (typically referred to as bisphenyl phenoxy). ULDPEs include, but are not limited to, polyethylene (ethylene-based) plastomers and polyethylene (ethylene-based) elastomers. Polyethylene (ethylene-based) elastomers plastomers generally have densities of 0.855 to 0.912 g/cm³.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

As described herein, a polyethylene "fraction" refers to a portion of the total composition of a polyethylene composition as described. Certain of the polyethylene compositions described herein include at least a "first polyethylene fraction" and a "second polyethylene fraction." Some polyethylene compositions may include a "third polyethylene fraction" and a "fourth polyethylene fraction." The various fractions included in such polyethylene compositions may be quantified by their temperature range in an elution profile via improved comonomers composition distribution (iCCD) analysis method. Unless specified otherwise, any elution profile referred to herein is the elution profile observed via iCCD. Examples of such fractions will be better understood in view of the examples provided herewith. Certain polyethylene compositions described herein may be referred to as "multimodal," meaning that they include at least two peaks in their elution profile. Certain polyethylene compositions described herein may be "bimodal," meaning that two major peaks are present. Other may be described as "trimodal," meaning that three peaks are present. As used herein, a "single peak" refers to an iCCD wherein a particular fraction includes only a single peak. That is, in some embodiments, the iCCD in a particular fraction may have only one upward sloping region followed by a downward sloping region to form the single peak.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting or" excludes any component, step or procedure not specifically delineated or listed.

The present invention provides multilayer films that include a combination of polyethylene compositions and that have desirable and/or improved properties. In some embodiments, multilayer films of the present invention provide improved dart while also providing higher modulus and/or higher gas barrier properties. In some embodiments, for example, the multilayer films can surprisingly incorporate a higher density polyethylene to provide a higher overall film density while also increasing the dart performance.

In one aspect, a multilayer film comprises:
(a) a first polyethylene composition that comprises:
(1) from 25 to 37 percent by weight of a first polyethylene fraction having a density in the range of 0.935 to 0.947 g/cm³ and a melt index ($I_2$) of less than 0.1 g/10 minutes; and
(2) from 63 to 75 percent by weight of a second polyethylene fraction; and wherein the first polyethylene composition has less than 0.10 branches per 1,000 carbon atoms when measured using $^{13}C$ NMR, wherein the density of the first polyethylene composition is at least 0.965 g/cm³, and wherein the melt index ($I_2$) of the first polyethylene composition is 0.5 to 10 g/10 minutes; and
(b) a second polyethylene composition that comprises:
(1) a first polyethylene fraction having a single peak in a temperature range of 45° C. to 87° C. in an elution profile via improved comonomer composition distribution (iCCD) analysis method, wherein a first polyethylene area fraction is an area in the elution profile beneath the single peak of the first polyethylene fraction between 45 and 87° C.; and
(2) a second polyethylene fraction having a single peak in a temperature range of 95° C. to 120° C. in the elution profile via iCCD analysis method and wherein a second polyethylene area fraction is an area in the elution profile beneath the single peak of the second polyethylene fraction between 95° C. and 120° C.;
wherein the second polyethylene composition has a density of 0.924 g/cm³ to 0.936 g/cm³ and a melt index ($I_2$) of 0.25 g/10 minutes to 2.0 g/10 minutes, wherein the second polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.;
wherein the multilayer film comprises 40 weight percent or less of the first polyethylene composition based on the total weight of the multilayer film. In some embodiments, the first polyethylene composition and the second polyethylene composition are in different layers of the multilayer film. In some embodiments, at least one layer of the multilayer film comprises the first polyethylene composition and the second polyethylene composition. Additional details on various embodiments of the first polyethylene composition are provided in the First Polyethylene Composition section below. Additional details on various embodiments of the second polyethylene composition are provided in the Second Polyethylene Composition section below.

In some embodiments, the layer comprising the first polyethylene composition further comprises 20 to 5000 ppm, based on the total weight of the layer of a nucleating agent, wherein the nucleating agent comprises a calcium salt of 1,2-cyclohexanedicarboxylic acid or sodium 4-[(4-chlorobenzoyl) amino] benzoate.

In some embodiments, an outer layer of the multilayer film comprises a third polyethylene composition, the third polyethylene composition comprising:
(a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile;
(b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and wherein the third polyethylene composition has a density of 0.880 g/cm³ to 0.910 g/cm³, a melt index ($I_2$) of 0.50 g/10 minutes to 6.0 g/10 minutes, and a zero shear viscosity ratio of the polyethylene composition less than 2.0. Additional details on various embodiments of the third polyethylene composition are provided in the Third Polyethylene Composition section below.

In some further embodiments, the first polyethylene composition and the second polyethylene composition are in different layers of the film, and the layer comprising the second polyethylene composition is between the outer layer comprising the third polyethylene composition and the layer comprising the first polyethylene composition.

In some embodiments, at least one layer further comprises linear low density polyethylene, low density polyethylene, or a combination thereof.

In another aspect, the present invention relates to articles such as packages. In one aspect, an article comprises any of the inventive multilayer films disclosed herein.

First Polyethylene Composition

As discussed above, multilayer films of the present invention include at least one layer comprising a first polyethylene composition having certain properties. The first polyethylene compositions used in embodiments of the present invention comprise (i) from 25 to 37 percent by weight of a first polyethylene fraction having a density in the range of 0.935 to 0.947 g/cm³ and a melt index ($I_2$) of less than 0.1 g/10 minutes; and (ii) from 63 to 75 percent by weight of a second polyethylene fraction, wherein the first polyethylene composition has less than 0.10 branches per 1,000 carbon atoms when measured using $^{13}C$ NMR, wherein the density of the first polyethylene composition is at least 0.965 g/cm³, and wherein the melt index ($I_2$) of the first polyethylene composition is 0.5 to 10 g/10 minutes.

In some embodiments, the first polyethylene composition has a melt index ($I_2$) of 2.5 g/10 minutes or less.

In some embodiments, the first polyethylene composition comprises from 25 to 37 percent by weight of the first polyethylene fraction having a density in the range of 0.940 to 0.947 g/cm³ and from 63 to 75 percent by weight of the second polyethylene fraction having a density of 0.970 g/cm³ or greater.

The first polyethylene composition may comprise a combination of two or more embodiments as described herein.

In one embodiment, the first polyethylene composition has a density of at least 0.965 g/cm³. In some embodiments, the first polyethylene composition has a density of at least 0.968 g/cm³. The first polyethylene composition, in some embodiments, has a density of up to 0.976 g/cm³. In some embodiments, the first polyethylene composition has a density in the range of 0.965 to 0.976 g/cm³, for example from 0.965 to 0.970, or from 0.967 to 0.969, or from 0.965 to 0.970 g/cm³. For example, the density can be from a lower limit of 0.965 or 0.967 g/cm³, to an upper limit of 0.970, 0.972, 0.975, or 0.976 g/cm³.

The first polyethylene composition has a melt index ($I_2$ or I2; at 190° C./2.16 kg) from 0.5 to 10 g/10 minutes. For example, the melt index ($I_2$ or I2; at 190° C./2.16 kg) can be from a lower limit of 0.5, 0.7, 0.9, 1.0, 1.1, 1.2, 1.5, 2, 3, 4, or 5 g/10 minutes, to an upper limit of 1.5, 2, 2.5, 3, 4, 5, 6, 7, 8, 9, or 10 g/10 minutes. In some embodiments, the fine polyethylene composition has a melt index ($I_2$) from 0.5 to S g/10 minutes, or from 0.5 to 2.5 g/10 minutes, or from 0.7 to 3 g/10 minutes, or from 1.0 to 2.0 g/10 minutes, or from 1.0 to 1.5 g/10 minutes.

In some embodiments, the first polyethylene composition has a melt index ratio ($I_{10}/I_2$) of 10 or more. The first polyethylene composition has a melt index ratio ($I_{10}/I_2$) of up to 17 in some embodiments. In some embodiments, the first polyethylene composition has a melt index ratio ($I_{10}/I_2$) of 10 to 17. The first polyethylene composition has a melt index ratio ($I_{10}/I_2$) of 12 to 17 in some embodiments.

The first polyethylene composition has low levels of branching. The first polyethylene composition has less than 0.10 branches per 1,000 carbon atoms when measured using $^{13}C$ NMR in some embodiments. The first polyethylene composition, in some embodiments has less than 0.07 branches per 1.000 carbon atoms when measured using $^{13}C$ NMR. The first polyethylene composition has less than 0.05 branches per 1,000 carbon atoms when measured using $^{13}C$ NMR in some embodiments. In some embodiments, the first polyethylene composition has less than 0.03 branches per 1,000 carbon atoms when measured using $^{13}C$ NMR.

In some embodiments, the first polyethylene composition has low levels of non-vinyl unsaturations. In some embodiments, the first polyethylene composition has less than 25 non-vinyl unsaturations per 1 million carbons when measured using $^{1}H$ NMR. The first polyethylene composition, in some embodiments, has less than 20 non-vinyl maturations per 1 million carbons when measured using $^{1}H$ NMR.

Without wishing to be bound by theory, it is believed that the combination of low levels of branching and low levels of non-vinyl unsaturation in the first polyethylene composition provide a greater amount of crystallinity in the first polyethylene composition, thereby improving its barrier properties when formed into a film.

In one embodiment, the first polyethylene composition has a ZSVR value of less than 2.0, or from 1.0 to 2.0, or from 1.2 to 1.8, or from 1.3 to 1.7.

In one embodiment, the first polyethylene composition has a molecular weight distribution, expressed as the ratio of the weight average molecular weight to number average molecular weight ($M_w/M_n$; as determined by conv. GPC) in the range of from 8.0 to 14.0. For example, the molecular weight distribution ($M_w/M_n$) can be from a lower limit of 8.0, 8.5, 9.0, or 9.5 to am upper limit of 10.0, 11.0, 11.5, 12.0, 12.5, 13.0, 13.5, or 14.0. In some embodiments, the $M_w/M_n$ is from 10.0 to 12.0.

In one embodiment, the first polyethylene composition has a number average molecular weight ($M_n$; as determined by conv. GPC) in the range from 8,000 to 20,000 g/mole. For example, the number average molecular weight can be from a lower limit of 8,000, 9,000, 10,000, or 11,000 g/mole, to an upper limit of 12,000, 13,000, 15,000, or 20,000 g/mole.

In one embodiment, the first polyethylene composition has a weight average molecular weight ($M_n$; as determined by conv. GPC) in the range from 100,000 to 125,000 g/mole. For example, the weight average molecular weight can be from a lower limit of 100,000, 105,000, or 110,000 g/mole, to an upper limit of 115,000, 120,000, or 124,000 g/mole.

In one embodiment, the first polyethylene composition has a z average molecular weight ($M_Z$; as determined by conv. GPC) of at least 350,000 g/mole such as in the range from 350,000 to 600,000 g/mole. For example, the z average molecular weight can be from a lower limit of 350,000, 375,000, 400,000, 405,000, or 410,000 g/mole, to an upper limit of 420,000, 425,000, 450,000, 475,000, 500,000, 550,000, or 600,000 g/mole.

In one embodiment, the first polyethylene composition has a $M_z/M_w$ ratio (each as determined by conv. GPC) of greater than 3.0. The first polyethylene composition has a $M_z/M_w$ ratio (each as determined by conv. GPC) of greater than 3.5 in some embodiments. The $M_z/M_w$ cm be from 3.0 to 4.0 in some embodiments, or from 3.5 to 4.5 in some embodiments, or from 3.5 to 4.0 in some embodiments.

In one embodiment, the first polyethylene composition has a ZSVR of less than 2.0 and a $M_z/M_w$ ratio (each as determined by conv. GPC) of greater than 3.0. In another embodiment, the first polyethylene composition has a ZSVR of less than 2.0 and a $M_z/M_w$ ratio (each as determined by conv. GPC) of greater than 3.5.

The first polyethylene composition preferably comprises ethylene-based polymers formed in the absence of comonomers. In some embodiments, the first polyethylene composition comprises at least 99% by weight ethylene-based polymers formed in the absence of comonomers. In some embodiments, the first polyethylene composition comprises at least 99% by weight polymers comprising a majority amount (>99 mol %) of units which have been derived from ethylene monomer.

The first polyethylene compositions comprise two fractions of polyethylenes.

The first polyethylene fraction has a density of 0.935 to 0.947 g/cm³. In some embodiments, the first polyethylene fraction has a density of 0.940 to 0.947 g/cm³. The first polyethylene fraction has a melt index ($I_2$) of less than 0.1 g/10 minutes. In some embodiments, the first polyethylene fraction has a melt index ($I_2$) of 0.01 g/10 minutes or greater. The first polyethylene fraction has a melt index from 0.05 to 0.1 g/10 minutes in some embodiments. The first polyethylene fraction, in some embodiments, has less than 0.10 branches per 1,000 carbon atoms when measured using $^{13}C$ NMR.

In some embodiments, the second polyethylene fraction has a density of 0.970 g/cm³ or more. In some embodiments, the first polyethylene fraction has a density of 0.940 to 0.947 g/cm³, and the second polyethylene fraction has a density of 0.970 g/cm³ or more. In some embodiments, the second polyethylene fraction has a melt index ($I_2$) of at least 100 g/10 minutes. In some embodiments, the second polyethylene fraction has a melt index ($I_2$) of at least 100 g/10 minutes and up to 10,000 g/10 minutes or more. The second polyethylene fraction has a melt index ($I_2$) of at least 100 g/10 minutes and up to 10,000 g/10 minutes, in some embodiments. The second polyethylene fraction has a melt index ($I_2$) of at least 100 g/10 minutes and up to 1,000 g/10 minutes, in some embodiments.

In some embodiments, the ratio of the melt index ($I_2$) of the second polyethylene fraction to the melt index ($I_2$) of the first polyethylene fraction is at least 1,000.

The first polyethylene composition comprises from 25 to 37 percent by weight of the first polyethylene fraction and from 63 to 75 percent by weight of the second polyethylene fraction, based on the total weight of the first polyethylene composition. In some embodiments, the first polyethylene composition comprises 30 to 37 percent by weight of the first polyethylene fraction and 63 to 70 percent by weight of the second polyethylene fraction, based on the total weight of the first polyethylene composition.

The following discussion focuses on preparation of the first polyethylene composition for use in embodiments of the present invention.

Polymerization

Any conventional polymerization processes may be employed to produce the first polyethylene composition. Such conventional polymerization processes include, but are not limited to, slurry polymerization processes, solution polymerization process, using one or more conventional reactors e.g. loop reactors, isothermal reactors, stirred tank reactors, batch reactors in parallel, series, and/or any combinations thereof. The first polyethylene composition may, for example, be produced via solution phase polymerization process using one or more loop reactors, isothermal reactors, and combinations thereof.

In general, the solution phase polymerization process occurs in one or more well-mixed reactors such as one or more isothermal loop reactors or one or more adiabatic reactors at a temperature in the range of from 115 to 250° C.; for example, from 115 to 200° C., and at pressures in the range of from 300 to 1,000 psi; for example, from 400 to 750 psi. In some embodiments, in a dual reactor, the temperature in the first reactor is in the range of from 115 to 190° C. for example from 115 to 175° C., and the second reactor temperature is in the range of 150 to 250° C., for example, from 130 to 165° C. In other embodiments, in a single reactor, the temperature in the reactor is in the range of from 115 to 250° C., for example, from 115 to 225° C.

The residence time in solution phase polymerization process may be in the range of from 2 to 30 minutes; for example, from 10 to 20 minutes. Ethylene, solvent, hydrogen, one or more catalyst systems, optionally one or more cocatalysts, and optionally one or more comonomers are fed continuously to one or more reactors. Exemplary solvents include but are not limited to, isoparaffins. For example, such solvents are commercially available under the name ISOPAR E from ExxonMobil Chemical Co., Houston, Texas. The resultant mixture of the first polyethylene composition and solvent is then removed from the reactor and the first polyethylene composition is isolated. Solvent is typically recovered via a solvent recovery unit, i.e. heat exchangers and vapor liquid separator drum, and is then recycled back into the polymerization system.

In one embodiment, the first polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the first polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

Specific embodiments of catalyst systems that can be used to produce the first polyethylene compositions described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "co-catalyst" and "activator" are interchangeable terms.

When used to describe certain carbon atom-containing chemical groups, a parenthetical expression having the form "$(C_x-C_y)$" means that the unsubstituted form of the chemical group has from x carbon atoms toy carbon atoms, inclusive of x and y. For example, a $(C_1-C_{40})$alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "$(C_x-C_y)$" parenthetical may contain more than y carbon atoms depending on the identity of any groups $R^S$. For example, a "$(C_1-C_{40})$alkyl substituted with exactly are group $R^S$, where $R^S$ is phenyl ($-C_6H_5$)" may contain from 7 to 46 carbon atoms. Thus, in general when a chemical group defined using the "$(C_x-C_y)$" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substation" means that at least one hydrogen atom (—H) bonded to a carbon atom or heteroatom of a corresponding unsubstituted compound or function group is replaced by a substituent (e.g. $R^S$). The term "persubstituuon" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "$(C_1-C_{40})$hydrocarbyl" means a hydrocarbon radical of from 1 to 40 carbon atoms and the term "$(C_1-C_{40})$hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a $(C_1-C_{40})$hydrocarbyl can be an unsubstituted or substituted $(C_1-C_{40})$alkyl, $(C_3-C_{40})$cycloalkyl, $(C_3-C_{20})$cycloalkyl-$(C_1-C_{20})$alkylene, $(C_6-C_{40})$aryl, or $(C_1-C_{20})$aryl-$(C_1-C_{20})$alkylene. In some embodiments, each of the aforementioned $(C_1-C_{40})$hydrocarbyl groups has a maximum of 20 carbon atoms (i.e., $(C_1-C_{20})$hydrocarbyl) and other embodiments, a maximum of 12 carbon atoms.

The terms "$(C_1-C_{40})$alkyl" and "$(C_1-C_{18})$alkyl" mean a saturated straight or branched hydrocarbon radical of from 1 to 40 carbon atoms or from 1 to 18 carbon atoms, respectively, that is unsubstituted or substituted by one or more RS Examples of unsubstituted $(C_1-C_{40})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl, and 1-decyl. Examples of substituted $(C_1-C_{40}n)$alkyl are substituted $(C_1-C_{20})$alkyl, substituted $(C_1-C_{10}$ alkyl, trifluoromethyl, and $[C_{45}]$alkyl. The term "$[C_{45}]$alkyl" (with square brackets) means there is a maximum of 45 carbon atoms in the radical, including substituents, and is, for example, a $(C_{27}-C_{40})$alkyl substituted by one $R^S$, which is a $(C_1-C_5)$alkyl, respectively. Each $(C_1-C_5)$alkyl may be methyl, trifluoromethyl, ethyl, 1-propyl, 1-methylethyl, or 1,1-dimethylethyl.

The term "$(C_6-C_{40})$aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted $(C_6-C_{40})$aryl are unsubstituted $(C_6-C_{20})$aryl unsubstituted $(C_6-C_{18})$aryl; 2-$(C_1-C_5)$alkyl-phenyl; 2,4-bis$(C_1-C_5)$alkyl-phenyl, phenyl; fluorenyl; tetrahydrofluorenyl; indacenyl; hexahydroindacenyl; indenyl; dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., —$CH_2$—) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. —$CH_2CH_2$—), propan-1,3-diyl (i.e. —$CH_2CH_2CH_2$—), 2-methylpropan-1,3-diyl (i.e. —$CH_2CH(CH_3)CH_2$—). Some examples of $(C_6-C_{50})$arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$ Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —$C(O)$—, and —$(CH_2)_{14}C(CH_3)_2(CH_2)_5$— (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene)bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), S(O)$_2$, Si($R^C$)$_2$, P($R^P$), N($R^N$), —N=C($R^C$)$_2$, —Ge($R^C$)$_2$—, or —Si($R^C$)—, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-S(O)$_2$—, $(C_1-C_{40})$hydrocarbyl-Si($R^C$)$_2$—, $(C_1-C_{40})$hydrocarbyl-N($R^N$)—, $(C_1-C_{40})$hydrocarbyl-P($R^P$)—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl, isothiazol-5-yl; imidazol-2-yl; oxazol-4-yl; thiazol-2-yl, 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-, 6,5,6-, or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include Si($R^C$)$_3$, Ge($R^C$)$_3$, Si($R^C$)$_2$, Ge($R^C$)$_2$, P($R^P$)$_2$, P($R^P$), N($R^N$)$_2$, N($R^N$), N, O, O$R^C$, S, S$R^C$, S(O), and S(O)$_2$, wherein each of the heteroalkyl and heteroalkylene groups are unsubstituted or substituted by one or more $R^S$.

Examples of unsubstituted $(C_2-C_{40})$heterocycloalkyl are unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride (F$^-$), chloride (Cl$^-$), bromide (Br$^-$), or iodide (I$^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing the first polyethylene composition includes a metal-ligand complex according to formula (I):

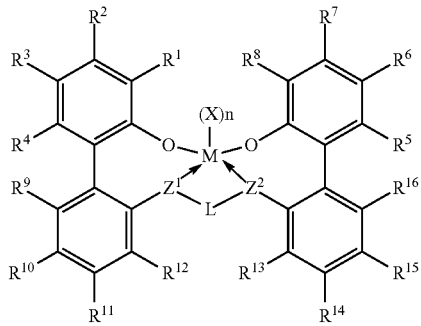

(I)

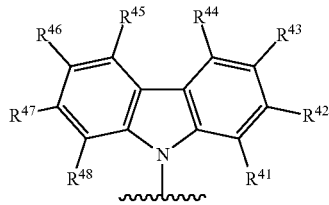

(III)

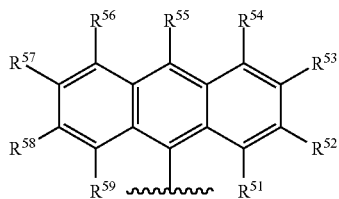

(IV)

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —N($R^N$)—, or —P($R^P$)—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), S(O)$_2$, Si($R^C$)$_2$, Ge($R^C$)$_2$, P($R^C$), or N($R^C$), wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, and radicals having formula (II), formula (III), or formula (IV):

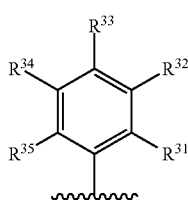

(II)

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^N$)$_2$NC(O)—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —Si($R^C$)$_3$, —Ge($R^C$)$_3$, —P($R^P$)$_2$, —N($R^N$)$_2$, —N=CH$R^C$, —O$R^C$, —S$R^C$, —NO$_2$, —CN, —CF$_3$, $R^C$S(O)—, $R^C$S(O)$_2$—, ($R^C$)$_2$C=N—, $R^C$C(O)O—, $R^C$OC(O)—, $R^C$C(O)N($R^N$)—, ($R^C$)$_2$NC(O)—, halogen, and —H.

In some embodiments, the first polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure:

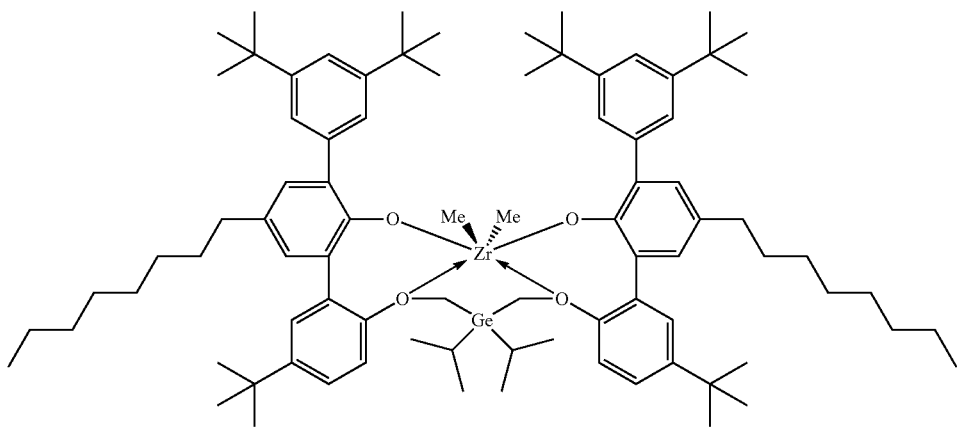

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Zr$ and the following structure:

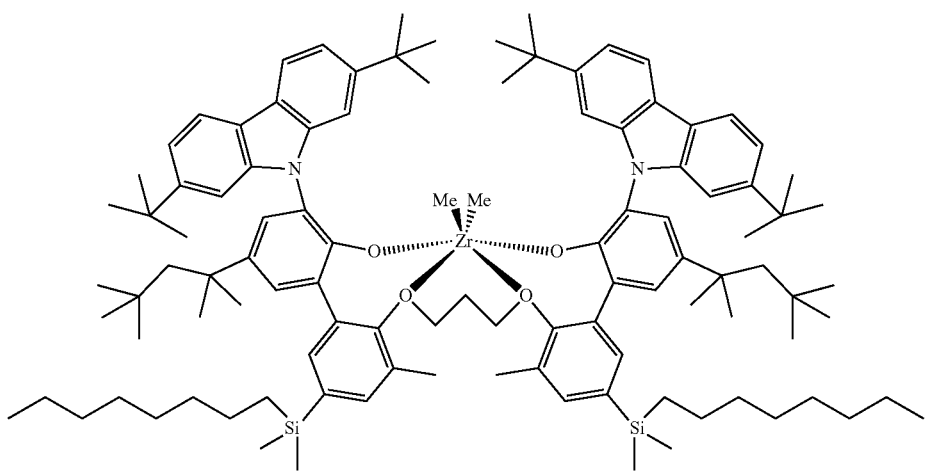

In other embodiments, the procatalyst used in the second loop is hafnium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Hf$ and the following structure:

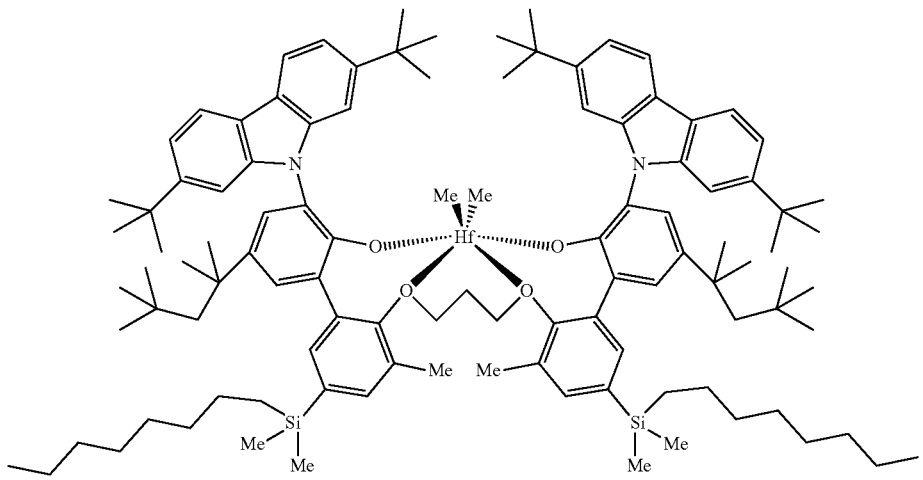

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1-C_{20})$hydrocarbyl substituents as described herein. In one embodiment. Group 13 metal compounds are in $((C_1-C_{20})$hydrocarbyl)-substituted-aluminum or $tri((C_1-C_{20})$hydrocarbyl)-boron compounds. In other embodiments. Group 13 metal compounds are tri(hydrocarbyl)-substituted-aluminum, $tri((C_1-C_{20})$hydrocarbyl)-boron compounds, $tri((C_1-C_{10})$alkyl)aluminum, $tri(C_6-C_{18})$aryl)boron compounds, and halogenated (including perhalogenated) derivatives thereof. In further embodiments, Group 13 metal compounds are tris(fluoro-substituted phenyl)boranes, tris(pentafluorophenyl)borane. In some embodiments, the activating co-catalyst is a tris $((C_1-C_{20})$hydrocarbyl borate (e.g. trityl tetrafluoroborate) or a $tri((C_1-C_{20})$hydrocarbyl)ammonium tetra$((C_1-C_{20})$hydrocarbyl)borane (e.g. bis(octadecyl)methylammonium tetrakis (pentafluorophenyl)borane). As used herein, the term "ammonium" means a nitrogen cation that is a $((C_1-C_{20})$ hydrocarbyl$)_4N^+$ a $((C_1-C_{20})$hydrocarbyl$)_3N(H)^+$, a $((C_1-C_{20})$hydrocarbyl$)_2N(H)_2^-$, $(C_1-C_{20})$hydrocarbylN(H$)_3^+$, or $N(H)_4^+$, wherein each $(C_1-C_{20})$hydrocarbyl, when two or more are present, may be the same or different.

Combinations of neutral Lewis acid activators (co-catalysts) include mixtures comprising a combination of a $tri((C_1-C_4)$alkyl)aluminum and a halogenated $tri((C_6-C_{18})$ aryl)boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Ratios of numbers of moles of (metal-ligand complex):(tris(pentafluoro-phenylborane): (alumoxane) [e.g., (Group 4 metal-ligand complex):(tris (pentafluoro-phenylborane):(alumoxane)] are from 1:1:1 to 1:10:30, in other embodiments, from 1:1:1.5 to 1:5:10.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate(I$^-$) amine, and combinations thereof.

In some embodiments, one or more of the foregoing activating co-catalysts are used in combination with each other. An especially preferred combination is a mixture of a $tri((C_1-C_4)$hydrocarbyl)aluminum, $tri((C_1-C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments. 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl)borane alone is used as the activating co-catalyst, in some other embodiments, the number of moles of the tris(pentafluorophenyl)borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Nucleating Agent

The layer incorporating the first polyethylene composition in multilayer films of the present invention, according to some embodiments, may further comprise a nucleating agent that is a calcium salt of 1,2-cyclohexanedicarboxylic acid or sodium 4-[(4-chlorobenzoyl) amino] benzoate. The first polyethylene composition and the nucleating agent may be blended and provided as a polyethylene-based composition in some embodiments. Such polyethylene-based composition may be coextruded with the other layers to form the multilayer film in some embodiments. Such nucleating agents, when used in the appropriate amount and in combination with the first polyethylene compositions described herein, are believed to provide a more homogenous distribution of crystals and crystal size in a polyethylene film, a more uniform melting behavior of the resulting polyethylene-based composition and film formed from the polyethylene-based composition, and one or more other improvements in the resulting films (e.g., stiffness, barrier, and/or optics).

In some embodiments, the nucleating agent is calcium salt of 1,2-cyclohexanedicarboxylic acid. In some embodiments, the nucleating agent is sodium 4-[(4-chlorobenzoyl) amino] benzoate. In some embodiments, such polyethylene-based compositions comprises both calcium salt of 1,2-cyclohexanedicarboxylic acid and sodium 4-[(4-chlorobenzoyl) amino] benzoate.

Nucleating agents, such as calcium salt of 1,2-cyclohexanedicarboxylic acid or sodium 4-[(4-chlorobenzoyl) amino] benzoate, are heterogeneous nucleating agents. The amount and type of heterogeneous nucleating agent is important in providing the desired performance. In some embodiments, the polyethylene-based composition comprises 20 to 5000 ppm heterogeneous nucleating agents in the form of calcium salt of 1,2-cyclohexanedicarboxylic acid or sodium 4-[(4-chlorobenzoyl) amino] benzoate, based on the total weight of the polyethylene-based composition, with the balance being the first polyethylene composition described herein. In some embodiments, the polyethylene-based composition comprises 20 to 2000 ppm of calcium salt of 1,2-cyclohexanedicarboxylic acid or sodium 4-[(4-chlorobenzoyl) amino] benzoate, based on the total weight of the polyethylene-based composition, with the balance being the first polyethylene composition described herein. In some embodiments, the polyethylene-based composition comprises 500 to 2000 ppm of calcium salt of 1,2-cyclohexanedicarboxylic acid or sodium 4-[(4-chlorobenzoyl) amino] benzoate, based on the total weight of the polyethylene-based composition, with the balance being the first polyethylene composition described herein.

In some embodiments, the heterogeneous nucleating agent may be provided with a fatty acid metal salt such as zinc stearate, zinc palmitate, and mixtures thereof. Based on how zinc stearate is prepared commercially, some zinc palmitate may also be present as commercial stearic acid often contains a substantial amount of palmitic acid. In some such embodiments, the polyethylene-based composition comprises 45 to 1000 ppm of at least one of zinc stearate and zinc palmitate, based on the total weight of the polyethylene-based composition. In some embodiments, the polyethylene-based composition comprises 50 to 700 ppm of zinc stearate and/or zinc palmitate, based on the total weight of the polyethylene-based composition. In some embodiments, the polyethylene-based composition comprises 85 to 600 ppm of zinc stearate and/or zinc palmitate, based on the total weight of the polyethylene-based composition.

One non-limiting example of a calcium salt of 1,2-cyclohexanedicarboxylic acid that can be used in embodiments of the present invention is Hyperform HPN-20E from Milliken Chemical, Spartanburg, South Carolina. Hyperform HPN-20E comprises 60-70 weight percent of calcium salt of 1,2-cyclohexanedicarboxylic acid and 30-40 weight percent of zinc stearate/zinc palmitate. In some embodiments, the polyethylene-based composition comprises 20 to 5000 ppm of Hyperform HPN-20E based on the total weight of the polyethylene-based composition. The polyethylene-based composition, in some embodiments, comprises 20 to 2000 ppm of Hyperform HPN-20E based on the total weight of the polyethylene-based composition.

One non-limiting example of sodium 4-[(4-chlorobenzoyl) amino] benzoate that can be used in embodiments of the present invention is Hyperform HPN 210M from Milliken Chemical, Spartanburg, South Carolina.

In some embodiments, the calcium salt of 1,2-cyclohexanedicarboxylic acid or sodium 4-[(4-chlorobenzoyl) amino] benzoate (and the fatty acid metal salt (e.g., zinc stearate and/or zinc palmitate) when also included) can be provided as a masterbatch by blending it with a carrier resin before combining with the first polyethylene compositions described herein. In some such embodiments, the carrier resin is a polyethylene having a melt index ($I_2$) of 1 to 12 g/10 minutes. In some embodiments where the calcium salt of 1,2-cyclohexanedicarboxylic acid and zinc stearate/zinc palmitate are provided as a masterbatch, the masterbatch comprises 2 to 4 weight percent of the calcium salt of 1,2-cyclohexanedicarboxylic acid and zinc stearate/zinc palmitate, based on the total weight of the masterbatch. In one embodiment, the carrier resin is a narrow molecular weight distribution high density polyethylene homopolymer having a density of 0.965 and a melt index ($I_2$) of 8 to 9 g/10 minutes. In some embodiments, the masterbatch can include other additives as well. Depending on the total amount of additives included, the masterbatch can comprise 85 to 98 weight percent of the carrier resin, based on the total weight of the masterbatch.

Other nucleating agents that can be used in some embodiments of the present invention include those disclosed in US Patent Publication Nos. 2015/0087758, 2015/0087759 and 2015/0086736, which are hereby incorporated by reference. In some embodiments, the polyethylene-based composition comprises 20 to 5000 ppm of such a nucleating agent based on the total weight of the polyethylene-based composition. The polyethylene-based composition, in some embodiments, comprises 20 to 2000 ppm of such a nucleating agent based on the total weight of the polyethylene-based composition.

Second Polyethylene Composition

As discussed above, multilayer films of the present invention include at least one layer comprising a second polyethylene composition having certain properties. In some embodiments, a layer in a multilayer film of the present invention comprises both the first polyethylene composition and the second polyethylene composition. In other embodiments, the first polyethylene composition and the second polyethylene composition are in different layers.

The second polyethylene compositions used in embodiments of the present invention comprise (1) a first polyethylene fraction having a single peak in a temperature range of 45° C. to 87° C. in an elution profile via improved comonomer composition distribution (iCCD) analysis method, wherein a first polyethylene area fraction is an area in the elution profile beneath the single peak of the first polyethylene fraction between 45 and 87° C. and (2) a second polyethylene fraction having a single peak in a temperature range of 95° C. to 120° C. in the elution profile via iCCD analysis method and wherein a second polyethylene area fraction is an area in the elution profile beneath the single peak of the second polyethylene fraction between 95° C. and 120° C. The second polyethylene composition has a density of 0.924 g/cm$^3$ to 0.936 g/cm$^3$ and a melt index (I2) of 0.25 g/10 minutes to 2.0 g/10 minutes, wherein the second polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.

In one or more embodiments, the second polyethylene composition may have a density of 0.924 g/cm$^3$ to 0.936 g/cm$^3$. For example, embodiments of the presently disclosed second polyethylene compositions may have densities of from 0.924 g/cm$^3$ to 0.931 g/cm$^3$, from 0.924 g/cm$^3$ to 0.928 g/cm$^3$, from 0.927 g/cm$^3$ to 0.931 g/cm$^3$, or from 0.929 g/cm$^3$ to 0.933 g/cm$^3$. According to additional embodiments, the second polyethylene composition may have a density of from 0.924 to 0.928, from 0.928 g/cm$^3$ to 0.932 g/cm$^3$, from 0.932 g/cm$^3$ to 0.936 g/cm$^3$, or any combination of these ranges.

In one or more embodiments, the second polyethylene composition may have a melt index (I$_2$) of 0.25 g/10 minutes to 2.0 g/10 minutes, such as 0.5 g/10 minutes to 1.2 g/10 minutes. For example, in one or more embodiments, the second polyethylene composition may have a melt index (I$_2$) of from 0.25 g/10 minutes to 0.5 g/10 minutes, from 0.5 g/10 minutes to 0.7 g/10 minutes, from 0.7 g/10 minutes to 0.9 g/10 minutes, from 0.59 g/10 minutes to 1.1 g/10 minutes, from 1.1 g/10 minutes to 1.3 g/10 minutes, from 1.3 g/10 minutes to 1.5 g/10 minutes, from 1.5 g/10 minutes to 1.7 g/10 minutes, from 1.7 g/10 minutes to 2.0 g/10 minutes, or any combination of these ranges. According to additional embodiments, the second polyethylene composition may have a melt index (I$_2$) of from 0.65 to 1.05.

According to embodiments, the second polyethylene compositions may have a molecular weight distribution, expressed as the ratio of the weight average molecular weight to number average molecular weight (Mw/Mn), in the range of from 2.5 to 8.0. For example, the second polyethylene composition may have a molecular weight distribution of from 2.5 to 3.0, from 3.0 to 3.5, from 3.5 to 4.0, from 4.0 to 4.5, from 4.5 to 5.0, from 5.0 to 5.5, from 5.5 to 6.0, from 6.0 to 6.5, from 6.5 to 7.0, from 7.0 to 7.5, from 7.5 to 8.0, or any combination of these ranges. In additional embodiments, the second polyethylene composition may have a molecular weight distribution of from 3.0 to 5.0. As presently described, the molecular weight distribution may be calculated according to gel permeation chromatography (GPC) techniques as described herein.

According to one or more additional embodiments, the second polyethylene composition may have a zero shear viscosity ratio of less than 3.0. For example, the second polyethylene composition may have a zero shear viscosity ratio of less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or even less than 1.1. In one or more embodiments, the second polyethylene composition may have a zero shear viscosity ratio of at least 1.0.

In reference to the described iCCD distribution, FIG. 1 schematically depicts a sample iCCD distribution 100 along with the cumulative weight fraction curve 200. FIG. 1 depicts, generally, several features of the iCCD profiles of the second polyethylene compositions, such as the first fraction, the second fraction, half peak widths, etc., which are discussed in detail herein. As such, FIG. 1 can be used as a reference with respect to the disclosures related the iCCD profile provided herein. Specifically, the first fraction 102 and second fraction 106 are depicted. The first fraction 102 has a peak 104 and the second fraction 106 has a peak 108. Each fraction has a half peak width 110 and 112. It should be understood that the profile of FIG. 1 is not derived from experimentation or observation, but is instead supplied for informational purposes of describing particular features of an iCCD elution profile.

In one or more embodiments, the first polyethylene fraction of the second polyethylene composition may have a single peak in a temperature range of 45° C. to 87° C. in an elution profile via iCCD. In one or more embodiments, the single peak of the first polyethylene fraction may be in a temperature range of from 60° C. to 85° C., such as from 70° C. to 85° C. Without being bound by theory, it is believed that in at least some embodiments of the second polyethylene compositions where a dual reactor design is used for polymerization, a combination of higher density crystalline domain and lower density amorphous domain may exist. The impact strength is controlled predominantly by the amorphous region or the tie concentrations that connect the adjacent lamellae. The relative tie chain concentration is estimated to be relatively large when the density is less than 0.910 g/cc. The peak of the first polymer fraction in the presently disclosed compositions may lie in the temperature range of 60° C. to 85° C., which may provide greater tie-chain concentration for functional benefits such as improved toughness.

It should be understood that a peak in the first or second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the second polyethylene fraction may have a single peak in the temperature range of 95° C. to 120° C. in the elution profile via iCCD. The temperature range of the second polyethylene fraction of 95° C. to 120° C. may be desirable because the low molecular weight, high density component at 95° C. to 120° C. may allow the polyethylene to achieve higher overall density w % bile maintaining a lower density fraction as described by the ratio of these two fractions.

In one or more embodiments, the width of the single peak of the second polyethylene fraction at 50 percent peak height may be less than 5.0° C., less than 4° C., or even less than 3° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comonomer incorporation on the higher density fraction, enabling higher density split between the two fractions.

In one or more embodiments, the second polyethylene composition may have a local minimum in an elution profile via iCCD in a temperature range of from 80° C. to 90° C. This local minimum may fall between the peaks of the first polyethylene fraction and the second polyethylene fraction.

In embodiments described herein, the first polyethylene fraction area is the area in the elution profile between 45° C. and 87° C. beneath the single peak of the first polyethylene fraction ° C. Similarly, the second polyethylene fraction area is the area in the elution profile between 95° C. and 120° C., beneath the single peak of the second polyethylene fraction. The first polyethylene fraction area and the second polyethylene fraction area, respectively, may correspond generally with the total relative mass of each polymer fraction in the polyethylene composition. In general, a polyethylene fraction area in an iCCD profile may be determined by integrating the iCCD profile between the starting and ending temperatures specified.

According to one or more embodiments, the difference between the single peak of the second polyethylene fraction and the single peak of the first polyethylene fraction may be at least 10° C. For example, the difference between the single peak of the second polyethylene fraction and the single peak of the first polyethylene fraction may be at least 12° C. 14° C., 16° C., 18° C., or even at least 20° C.

In one or more embodiments, the first polyethylene fraction area may comprise at least 40% of the total area of the elution profile (for example, at least 42%, at least 44%, at least 46%, at least 48%, at least 50%, at least 52%, or even at least 54% of the total area of the elution profile). For example, the first polyethylene fraction area may comprise from 40% to 65% of the total area of the elution profile, such as from 42% to 58%, from 43% to 45%, from 45% to 47%, from 53% to 55%, or from 55% to 57%.

According to one or more embodiments, the second polyethylene fraction area may comprise at least 25% of the total area of the elution profile (for example, at least 30%, at least 35%, or even at least 40% of the total area of the elution profile). For example, the first polyethylene fraction area may comprise from 20% to 50%, from 27% to 31% or from 41% to 48% of the total area of the elution profile.

According to some embodiments, a ratio of the first polyethylene fraction area to the second polyethylene fraction area may be from 0.75 to 2.5 (such as 0.75 to 1.0, 1.0 to 1.25, from 1.25 to 1.5, from 1.5 to 1.75, from 1.75 to 2.0, from 2.0 to 2.25, from 2.25 to 2.5, or any combination of these ranges).

In one or more embodiments, the second polyethylene composition is formed from the polymerization of ethylene and a comonomers such as a C3-C12 alkene. Contemplated comonomers include C6-C9 alkenes, such as 1-octene and 1-hexene. In one or more embodiments the comonomers is 1-octene.

In one or more embodiments, the difference between the single peak of the second polyethylene fraction and the single peak of the first polyethylene fraction is at least 10° C., at least 12.5° C. at least 15° C., at least 17.5° C., or even at least 20° C.

In one or more embodiments, the first polyethylene fraction may have a melt index ($I_2$) of 0.01 to 0.18 g/10 minutes. For example, according to one or more embodiments, the first polyethylene fraction may have a melt index ($I_2$) of from 0.01 g/10 minutes to 0.03 g/10 minutes, from 0.03 g/10 minutes to 0.05 g/10 minutes, from 0.05 g/10 minutes to 0.07 g/10 minutes, from 0.07 g/10 minutes to 0.09 g/10 minutes, from 0.09 g/10 minutes to 0.11 g/10 minutes, from 0.11 g/10 minutes to 0.13 g/10 minutes, from 0.13 g/10 minutes to 0.15 g/10 minutes, from 0.15 g/10 minutes to 0.18 g/10 minutes, or any combination of these ranges.

In one or more embodiments, the second polyethylene fraction may have a melt index ($I_2$) of 1 to 10,000 g/10 minutes. For example, according to one or more embodiments, the second polyethylene fraction may have a melt index ($I_2$) of from 10 g/10 minutes to 1,000 g/10 minutes, from 20 g/10 minutes to 800 g/10 minutes, from 1 g/10 minutes to 100 g/10 minutes, from 100 g/10 minutes to 1,000 g/10 minutes, from 1,000 g/10 minutes to 10,000 g/10 minutes, or any combination of these ranges.

In one or more embodiments, the weight average molecular weight of the second polyethylene fraction may be less than or equal to 120,000 g/mol, such as from 20,000 g/mol to 120,000 g/mol, or from 40,000 g/mol to 65,000 g/mol. In additional embodiments, the weight average molecular weight of the second polyethylene fraction may be from 20,000 g/mol to 40,000 g/mol, from 40,000 g/mol to 60,000 g/mol, from 60,000 g/mol to 80,000 g/mol, from 80,000 g/mol to 100,000 g/mol, from 100,000 g/mol to 120,000 g/mol, or any combination of these ranges. Molecular weight of the polyethylene fractions may be calculated based on GPC results, as described hereinbelow.

According to additional embodiments, the second polyethylene compositions may have Dow Rheology Index of less than or equal to 5, such as less than or equal to 4, less than or equal to 3, less than or equal to 2, or even less than or equal to 1.

In one or more embodiments, the second polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The second polyethylene compositions may contain from about 0.1 to about 10 percent by the combined weight of such additives, based on the weight of the second polyethylene composition including such additives.

Polymerization

Any conventional polymerization processes may be employed to produce the second polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In other embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the second polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the second polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

The same catalyst systems described in connection with production of the first polyethylene composition can be used to produce the polyethylene compositions of the second composition. As set forth in the Examples section, the processes for production of the first polyethylene composition and the second polyethylene composition differ such that the resulting polyethylene compositions have different properties as described herein.

Multilayer Films

Multilayer films of the present invention include both the first polyethylene composition and the second polyethylene compositions. In some embodiments, a layer in a multilayer of the present invention comprises both the first polyethylene composition and the second polyethylene composition. In other embodiments, the first polyethylene composition and the second polyethylene composition are in different layers.

In some embodiments of multilayer films of the present invention, a multilayer film can include the first polyethylene composition as described in more than one layer while in other embodiments, the first polyethylene composition is provided in a single layer. The multilayer film comprises 40 weight percent or less of the first polyethylene composition, based on the total weight of the multilayer film. In some embodiments, the multilayer film comprises at least 20 weight percent of the first compositions, based on the total weight of the multilayer film. The multilayer film comprises from 20 weight percent to 40 weight percent of the first polyethylene composition in some embodiments, based on the total weight of the multilayer film. For example, the multilayer film may comprise from 20, 21, 22, 23, 24, 25, 26, 27, 28, 29, or 30 weight percent to 31, 32, 33, 34, 35, 36, 37, 38, 39, or 40 weight percent of the first polyethylene composition, based on the total weight of the multilayer film. In some embodiments, the multilayer film comprises from 30 weight percent to 40 weight percent of the first polyethylene composition, based on the total weight of the multilayer film.

The amount of the second polyethylene composition to use in films of the present invention can depend on a number of factors including, for example, the other layers in the film, the desired properties of the film, the end use application of the film, and others. The multilayer film comprises from 20 weight percent to 80 weight percent of the second polyethylene composition in some embodiments, based on the total weight of the multilayer film. For example, the multilayer film may comprise from 20, 21, 22, 23, 24, 25, 26, 27, 28, 29, or 30 weight percent to 30, 35, 40, 45, 50, 55, 60, 65, 70, 75 or 80 weight percent of the second polyethylene composition, based on the total weight of the multilayer film. In some embodiments, the multilayer film comprises from 20 weight percent to 70 weight percent of the second polyethylene composition, based on the total weight of the multilayer film.

The number of layers in the film can depend on a number of factors including, for example, the desired properties of the film, the desired thickness of the film, the content of the other layers of the film, the end use application of the film, the equipment available to manufacture the film, and others. A multilayer film of the present invention can comprise up to 2, 3, 4, 5, 6, 7, 8, 9, 10, or 11 layers in various embodiments. In some embodiments, the multilayer film is a five layer film. The multilayer film, in some embodiments, is a three layer film.

One or more layers in the multilayer film may further comprise other polymers in addition to the first polyethylene composition and the second polyethylene composition. For example, in some embodiments, in addition to the first polyethylene composition and the second polyethylene composition described above, one or more layers of the multilayer film may further comprise low density polyethylene (LDPE) or linear low density polyethylene (LLDPE). For example, LDPE can be included in some layers to facilitate processing. In some embodiments where LDPE is used in the film, the LDPE can comprise 1 to less than 50 weight percent of LDPE based on the total weight of the multilayer film. In some embodiments, the multilayer film can comprise 1 to 30 weight percent of LDPE based on the total weight of the film. In some embodiments, the multilayer film can comprise 20 to 30 weight percent of LDPE based on the total weight of the film. Examples of commercially available LDPE can be used in some embodiments of the present invention include, LDPE available from The Dow Chemical Company, such as DOW™ LDPE 132I, DOW™ LDPE 203M, DOW™ 586A, DOW™ LDPE 230N, and AGILITY™ 1021. In some embodiments where LLDPE is used in the film, the LLDPE can comprise 1 to less than 50 weight percent of LDPE based on the total weight of the multilayer film. In some embodiments multilayer film can comprise 20 to 50 weight percent of LLDPE based on the total weight of the film. Examples of commercially available LLDPE can be used in some embodiments of the present invention include, LLDPE available from The Dow Chemical Company, such as DOWLEX™ GM 8051F, DOWLEX™ GM 8051G, DOWLEX™ GM 8051, DOWLEX™ GM 8070, DOWLEX™ TG 2085B, INNATE™ ST50, ELITE™ NG5400B, ELITE™ NG5401B, ELITE™ 5400G, AND ELITE™ 5401G.

In some embodiments, one outer layer of the multilayer film is a sealant layer. The sealant layer can be used to form an article or package by using the sealant layer to adhere the film to another film, to a laminate, or to itself. The sealant layer is thus an outermost layer of the multilayer film.

In some embodiments, the sealant layer can comprise any resins known to those having ordinary skill in the art to be useful as a sealant layer.

The sealant layer, in some embodiments, may comprise one or more ethylene-based polymers having a density from 0.890 to 0.925 g/cm$^3$ and a melt index ($I_2$) from 0.1 to 2.0 g/10 min. In further embodiments, the ethylene-based polymer of the sealant film (or sealant layer) may have a density from 0.900 to 0.925 g/cm$^3$, or 0.910 to 0.925 g/cm$^3$. Additionally, the ethylene-based polymer of the sealant film (or sealant layer) may have a melt index ($I_2$) from 0.1 to 2.0 g/10 min, or from 0.1 to 1.5 g/10 min. Various commercial polyethylenes are considered suitable for the sealant film. Suitable commercial examples may include ELITE™ 5400G, ELITE™ 5401B, and various AFFINITY™ polyolefin plastomers (e.g., AFFINITY™ 1888, AFFINITY™ 1140, and AFFINITY™ 1146), each of which are available from The Dow Chemical Company (Midland, MI).

In further embodiments, the sealant layer of a multilayer film, may comprise additional ethylene based polymers, for example, a polyolefin plastomer, LDPE, LLDPE, and others. The LDPE of the sealant film or sealant layer may generally include any LDPE known to those of skill in the art including, for example, DOW™ LDPE 132I and DOW™ LDPE 586A. In embodiments utilizing a polyolefin plastomer, the polyolefin plastomer may have a melt index ($I_2$) of 0.2 to 5 g/10 min, or from 0.5 to 2.0 g/10 min. Moreover, the polyolefin plastomer may have a density of 0.890 g/cc to 0.920 g/cc, or from 0.900 to 0.910 g/cm$^3$. Various commercial polyolefin plastomers are considered suitable for the sealant film. Suitable examples include AFFINITY™ PL 1881G, AFFINITY™ PL 1888G, AFFINITY™ PF 1140G, and AFFINITY™ PF 1146G from The Dow Chemical Company (Midland, MI). In embodiments where the sealant layer includes LLDPE, the LLDPE may generally include any LLDPE known to those of skill in the art including, for example, those commercially available from The Dow Chemical Company such as DOWLEX™ NG2045B, DOWLEX™ TG2085B, DOWLEX™ GM 8051, DOWLEX™ GM 8070, DOWLEX™ GM 8085, and DOWLEX™ 5056G. Another example of ethylene based polymers that can be included are INNATE™ polyethylene resins having a density of 0.918 g/cm$^3$ or less, commercially available from The Dow Chemical Company as INNATE™ ST50 and INNATE™ TH60.

In some embodiments, the sealant layer comprises a blend of an ethylene-based polymers having a density from 0.900 to 0.925 g/cm$^3$ and a melt index ($I_2$) from 0.1 to 2.0 g/10 min and a polyolefin plastomer. For example, in some embodiments, such a blend can comprise ELITE® 5400G or ELITE® 5401B and AFFINITY™ PL 1881G. As another example, in some embodiments, such a blend can comprise INNATE™ ST50 and AFFINITY™ PL 1881G.

In some embodiments, the sealant layer comprises a blend of an LLDPE and a polyolefin plastomer. For example, in some embodiments, such a blend can comprise DOWLEX™ NG 2045B or DOWLEX™ GM 8051 and AFFINITY™ PL 1881G.

In some embodiments, the sealant layer comprises a blend of an LLDPE and a LDPE. For example, in some embodiments, such a blend can comprise DOWLEX™ NG 2045B or DOWLEX™ GM 8051 as the LLDPE and DOW™ LDPE 132I or DOW™ LDPE 586A as the LDPE. In some such embodiments, the amount of LDPE is 30 weight percent or less based on the weight of the sealant layer.

In some embodiments, the sealant layer comprises a blend of a polyolefin plastomer and a LDPE. For example, in some embodiments, such a blend can comprise AFFINITY™ PL 1881G, AFFINITY™ PL 1888G. AFFINITY™ PF 1140G. and AFFINITY™ PF 1146G as the polyolefin plastomer component and DOW™ LDPE 132I or DOW™ LDPE 586A as the LDPE. In some such embodiments, the amount of LDPE is 30 weight percent or less based on the weight of the sealant layer.

It may be particularly advantageous in some embodiments to use a third polyethylene composition (or sealant resin) in the sealant layer. For example, the third polyethylene composition (or sealant resin), in some embodiments, can provide a low heat seal initiation temperature (similar to a polyolefin plastomer), but with less bubble blocking relative to a polyolefin plastomer having an equivalent heat seal initiation temperature. The third polyethylene composition (sealant resin) is described further below.

It should be understood that, in some embodiments, any of the layers within the film can further comprise one or more additives (in addition to those described above for the polyethylene-based composition) as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

In some embodiments, the multilayer films are formed primarily from polyethylene. By being polyethylene-based, the inventive multilayer films, according to some embodiments of the present invention, can be incorporated into articles that are comprised primarily, if not substantially or entirely, of polyethylene in order to provide articles that are more easily recyclable. For example, a multilayer film that comprises primarily polyethylene has an improved recyclability profile in addition to other advantages that the usage of such polymers may provide. For example, in some embodiments, other than additives, the multilayer film is comprised entirely of ethylene-based polymers. Based on the total weight of the multilayer film, the multilayer film may include 90% by weight ethylene-based polymer in some embodiments, or 95% by weight ethylene-based polymer in some embodiments, or 99% by weight ethylene-based polymer in some embodiments, or 99.9% by weight ethylene-based polymer in some embodiments, or 100% by weight ethylene-based polymer in some embodiments.

The multilayer films can have a variety of thicknesses depending, for example, on the number of layers, the intended use of the film, and other factors. Such multilayer films, in some embodiments, have a total thickness less than 200 microns, or less than 150 microns in some embodiments, or less than 120 microns in some embodiments. In some embodiments, multilayer films of the present invention have a total thickness of 30 to 200 microns, or 30 to 150 microns, or 30 to 120 microns.

The multilayer films can be formed using techniques known to those of skill in the art based on the teachings herein. For example, the films can be prepared as blown films (e.g., water quenched blown films) or cast films. For example, in the case of multilayer films, for those layers that can be coextruded, such layers can be coextruded as blown films or cast films using techniques known to those of skill in the art based on the teachings herein.

Multilayer films of the present invention can exhibit one or more desirable properties. For example, in some embodiments, multilayer films can exhibit desirable dart impact values, secant modulus, barrier properties, and/or others. In particular, in some embodiments, multilayer films of the present invention can surprisingly exhibit a good balance of dart impact (toughness) and secant modulus when compared to multilayer films having the same overall density. In addition, in some embodiments, the increased density of the inventive multilayer films can also increase the barrier properties of the multilayer film.

In one example embodiment, a multilayer film of the present invention is a three layer film, wherein the first polyethylene composition is in a core layer as described herein and wherein the two outer layers comprise the second polyethylene composition as described herein.

In another example embodiment, a multilayer film of the present invention is a three layer film having a layer arrangement of A/B/C, wherein the A layer is a sealant layer (as described above), wherein the B layer comprises the first polyethylene composition as described herein, and wherein the C layer comprises the second polyethylene composition as described herein. In a further embodiment, the A layer comprises the third polyethylene composition as described herein.

In another example embodiment, a multilayer film of the present invention is a five layer film having a layer arrangement of A/B/C/B/D, wherein the A layer is a sealant layer (as described above), wherein the B layers comprise the second polyethylene composition as described herein, wherein the C layer comprises the first polyethylene composition as described herein, and wherein the D layer comprises a linear low density polyethylene. In a further embodiment, the A layer comprises the third polyethylene composition as described herein.

In another example embodiment, a multilayer film of the present invention is a five layer film having a layer arrangement of AB/C/C/B, wherein the A layer is a sealant layer (as described above), wherein the B layers comprise the second polyethylene composition as described herein, and wherein the C layers comprise the first polyethylene composition as described herein. In a further embodiment, the A layer comprises the third polyethylene composition as described herein.

In another example embodiment, a multilayer film of the present invention is a five layer film having a layer arrangement of A/B/C/B/D, wherein the A layer is a sealant layer (as described above), wherein the B layers comprise the first polyethylene composition as described herein, wherein the C layer comprises the second polyethylene composition as described herein, and wherein the D layer comprises a linear low density polyethylene. In a further embodiment, the A layer comprises the third polyethylene composition as described herein.

In another example embodiment, a multilayer film of the present invention is a five layer film having a layer arrangement of AB/C/B/C, wherein the A layer is a sealant layer (as described above), wherein the B layers comprise the second polyethylene composition as described herein, and wherein the C layers comprise the first polyethylene composition as described herein. In a further embodiment, the A layer comprises the third polyethylene composition as described herein.

In another example embodiment, a multilayer film of the present invention is a five layer film having a layer arrangement of A/B/AB/A, wherein the A layers comprise the second polyethylene composition as described herein, and wherein the B layers comprise the first polyethylene composition as described herein.

Third Polyethylene Composition (Sealant Resin)

As noted above, in some embodiments, multilayer films of the present invention include an outer layer, which is a sealant layer, that comprises a third polyethylene composition. The third polyethylene composition, in some embodiments, comprises (a) a first polyethylene fraction comprising at least one peak in a temperature range of 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile, (b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile. The third polyethylene composition may have a density of 0.880 g/cm$^3$ to 0.910 g/cm$^3$, a melt index ($I_2$) of 0.50 g/10 minutes to 6.0 g/10 minutes, and a zero shear viscosity ratio of the third polyethylene composition less than 2.0.

In one or more embodiments, the third polyethylene composition may have a density of 0.880 g/cm$^3$ to 0.910 g/cm$^3$. For example, embodiments of the third polyethylene compositions may have densities of from 0.880 g/cm$^3$ to 0.908 g/cm$^3$, from 0.880 g/cm$^3$ to 0.906 g/cm$^3$, from 0.880 g/cm$^3$ to 0.904 g/cm$^3$, from 0.880 g/cm$^3$ to 0.902 g/cm$^3$, from 0.880 g/cm$^3$ to 0.900 g/cm$^3$, from 0.900 g/cm$^3$ to 0.908 g/cm$^3$, from 0.900 g/cm$^3$ to 0.906 g/cm$^3$, from 0.900 g/cm$^3$ to 0.904 g/cm$^3$, from 0.900 g/cm$^3$ to 0.902 g/cm$^3$, from 0.902 g/cm$^3$ to 0.910 g/cm$^3$, from 0.902 g/cm$^3$ to 0.908 g/cm$^3$, from 0.902 g/cm$^3$ to 0.906 g/cm$^3$, from 0.902 g/cm$^3$ to 0.904 g/cm$^3$, from 0.904 g/cm$^3$ to 0.910 g/cm$^3$, from 0.904 g/cm$^3$ to 0.908 g/cm$^3$, from 0.904 g/cm$^3$ to 0.906 g/cm$^3$, from 0.906 g/cm$^3$ to 0.910 g/cm$^3$, from 0.906 g/cm$^3$ to 0.908 g/cm$^3$, from 0.908 g/cm$^3$ to 0.910 g/cm$^3$, or any combination of these ranges.

In one or more embodiments, the third polyethylene composition may have a melt index ($I_2$) of 0.50 g/10 minutes to 6.0 g/10 minutes. For example, in one or more embodiments, the third polyethylene composition may have a melt index ($I_2$) of from 0.5 g/10 minutes to 5.0 g/10 minutes, from 0.5 g/10 minutes to 4.0 g/10 minutes, from 0.5 g/10 minutes to 3.0 g/10 minutes, from 0.5 g/10 minutes to 2.0 g/10 minutes, from 0.5 g/10 minutes to 1.0 g/10 minutes, from 1.0 g/10 minutes to 6.0 g/10 minutes, from 1.0 g/10 minutes to 5.0 g/10 minutes, from 1.0 g/10 minutes to 4.0 g/10 minutes, from 1.0 g/10 minutes to 3.0 g/10 minutes, from 1.0 g/10 minutes to 2.0 g/10 minutes, from 2.0 g/10 minutes to 6.0 g/10 minutes, from 2.0 g/10 minutes to 5.0 g/10 minutes, from 2.0 g/10 minutes to 4.0 g/10 minutes, from 2.0 g/10 minutes to 3.0 g/10 minutes, from 3.0 g/10 minutes to 6.0 g/10 minutes, from 3.0 g/10 minutes to 5.0 g/10 minutes, from 3.0 g/10 minutes to 4.0 g/10 minutes, from 4.0 g/10 minutes to 6.0 g/10 minutes, from 4.0 g/10 minutes to 5.0 g/10 minutes, from 5.0 g/10 minutes to 6.0 g/10 minutes, or any combination of these ranges.

According to embodiments, the third polyethylene compositions may have a molecular weight distribution, expressed as the ratio of the weight average molecular weight to number average molecular weight (Mw/Mn), in the range of from 2.0 to 6.0. For example, the third polyethylene composition may have a molecular weight distribution of from 2.0 to 5.5, 2.0 to 5.0, 2.0 to 4.5, 2.0 to 4.0, 2.0 to 3.5, 2.0 to 3.0, 2.0 to 2.5, 2.5 to 6.0, 3.0 to 5.5, 3.0 to 5.0, 3.0 to 4.5, 3.0 to 4.0, 3.0 to 3.5, 3.5 to 6.0, 3.5 to 5.5, 3.5 to 5.0, 3.5 to 4.5, 3.5 to 4.0, 4.0 to 6.0, 4.0 to 5.5, 4.0 to 5.0, 4.0 to 4.5, 4.5 to 6.0, 4.5 to 5.5, 4.5 to 5.0, 5.0 to 6.0, 5.0 to 5.5, or 5.5 to 6.0, or any combination of these ranges. As presently described, the molecular weight distribution may be calculated according to gel permeation chromatography (GPC) techniques as described herein.

According to one or more additional embodiments, the third polyethylene composition may have a zero shear viscosity ratio of less than 2.0. For example, the third polyethylene composition may have a zero shear viscosity ratio of less than 1.9, less than 1.8, less than 1.7, less than 1.6, less than 1.5, less than 1.4, less than 1.3, less than 1.2, or even less than 1.1. In one or more embodiments, the third polyethylene composition may have a zero shear viscosity ratio of at least 1.0. In embodiments, the third polyethylene composition may have a zero shear viscosity ratio of from 1.0 to 2.0, from 1.0 to 1.8, from 1.0 to 1.6, from 1.0 to 1.4, from 1.0 to 1.2, from 1.2 to 2.0, from 1.2 to 1.8, from 1.2 to 1.6, from 1.2 to 1.4, from 1.4 to 2.0, from 1.4 to 1.8, from 1.4 to 1.6, from 1.6 to 2.0, from 1.6 to 1.8, or from 1.8 to 2.0.

Tan delta (tan δ) refers to a measure of how close a material is to a perfectly-elastic solid (where d=0°, tan delta=0) or of how close a material is to a perfectly-Newtonian liquid (where d=90°, tan delta≈infinity). Thus, lower values of tan d reflect greater elasticity. Tan delta is a function of long chain branching (LCB) and molecular weight distribution (MWD) at the same overall molecular weight. Higher tan delta values indicate lower LCB. In embodiments, the third polyethylene composition may have a tan delta at 0.1 radian/sec and 190° C., of from 10 to 100, 10 to 90, 10 to 80, 10 to 70, 10 to 60, 10 to 50, 10 to 40, 10 to 30, 10 to 20, 20 to 100, 20 to 90, 20 to 80, 20 to 70, 20 to 60, 20 to 50, 20 to 40, 20 to 30, 30 to 100, 30 to 90, 30 to 80, 30 to 70, 30 to 60, 30 to 50, 30 to 40, 40 to 100, 40 to 90, 40 to 80, 40 to 70, 40 to 60, 40 to 50, 50 to 100, 50 to 90, 50 to 80, 50 to 70, 50 to 60, 60 to 100, 60 to 90, 60 to 80, 60 to 70, 70 to 100, 70 to 90, 70 to 80, 80 to 100, 80 to 90, or 90 to 100.

The third polyethylene composition may include at least a first polyethylene fraction and a second polyethylene fraction. Embodiments may include a third polyethylene fraction and a fourth polyethylene fraction. The various fractions included in the third polyethylene composition may be defined by their temperature range in an elution profile via improved comonomers composition distribution (iCCD) analysis method. Examples of such fractions will be better understood in view of the examples provided herewith.

In general, the first fraction may include at least one peak in the temperature range of the first fraction. The second fraction may include at least one peak in the temperature range of the second fraction. The fourth fraction may include at least one peak in the temperature range of the fourth fraction. The first polyethylene area fraction, the second polyethylene fraction, the third polyethylene fraction, and the fourth polyethylene fraction, respectively, may each include a portion of the total mass of the third polyethylene composition.

In one or more embodiments, one or more of the first polyethylene fraction, the second polyethylene fraction, and the fourth polyethylene fraction may have a single peak.

It should be understood that a peak in one or more of the first polyethylene fraction, the second polyethylene fraction, and the fourth polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In one or more embodiments, the first polyethylene fraction may be an area in the elution profile from 35° C. to 70° C. In additional embodiments, the first polyethylene fraction may be an area in the elution profile in the temperature range of 35° C. to 60° C., 35° C. to 50° C., 40° C. to 70° C., 40° C. to 60° C., 40° C. to 50° C., 50° C. to 70° C., 50° C. to 60° C., 60° C. to 70° C., or any combinations in the elution profile via iCCD.

According to one or more embodiments, the first polyethylene fraction area may comprise at least 25% of the total area of the elution profile (for example, at least 30%, at least 40%, at least 50%, or even at least 60 of the total area of the elution profile). For example, the first polyethylene fraction area may comprise from 25% to 65%, 25% to 55%, 25% to 45%, 25% to 35%, 35% to 65%, 35% to 55%, 35% to 45%, 45% to 65%, 45% to 55%, 55% to 65%, or any combinations of the total area of the elution profile.

In one or more embodiments, the first polyethylene fraction may have at least one peak in the temperature range of 35° C. to 70° C. in the elution profile via iCCD. In one or more embodiments, the first polyethylene fraction may have at least one peak in the temperature range of 35° C. to 60° C. 35° C. to 50° C., 40° C. to 70° C., 40° C. to 60° C., 40° C. to 50° C. 50° C. to 70° C., 50° C. to 60° C., 60° C. to 70° C., or any combinations in the elution profile via iCCD.

The temperature range of the first polyethylene fraction of 35° C. to 70° C. may be desirable because it may correspond to a low density component of the third polyethylene composition. In embodiments, the low density component may provide low the hot tack initiation temperatures, heat seal initiation temperatures, or both. Therefore, increasing the first polyethylene fraction, which may include the low density component, may thereby lower the hot tack initiation temperatures, heat seal initiation temperatures, or both of the third polyethylene composition and improve hot tack strength and hot tack window.

In one or more embodiments, the second polyethylene fraction may be an area in the elution profile from 85° C. to 120° C. In additional embodiments, the second polyethylene fraction may be an area in the elution profile in the temperature range of 85° C. to 110° C., 85° C. to 100° C., 85° C. to 90° C., 90° C. to 120° C., 90° C. to 110° C., 90° C. to 100° C., 100° C. to 120° C., 100° C. to 110° C., 110° C. to 120° C., or any combinations in the elution profile via iCCD.

According to one or more embodiments, the second polyethylene fraction area may comprise at least 20% of the total area of the elution profile (for example, at least 30%, at least 35%, at least 40%, or at least 45% of the total area of the elution profile). For example, the second polyethylene fraction area may comprise from 20% to 60%, from 20% to 50%, from 20% to 40%, from 20% to 30%, from 30% to 60%, from 30% to 50%, from 30% to 40%, from 40% to 60%, from 40% to 50%, from 50% to 60%, or any combinations of the total area of the elution profile.

In one or more embodiments, the second polyethylene fraction may have at least one peak in the temperature range of 85° C. to 120° C. in the elution profile via iCCD. In one or more embodiments, the second polyethylene fraction may have at least one peak in the temperature range of 85° C. to 110° C., 85° C. to 100° C., 85° C. to 90° C. 90° C. to 120°

C., 90° C. to 110° C., 90° C. to 100° C., 100° C. to 120° C., 100° C. to 110° C., 110° C. to 120° C., or any combinations in the elution profile via iCCD.

The temperature range of the second polyethylene fraction of 85° C. to 120° C. may be desirable because it may correspond to a high density component. In embodiments, increasing the high density component may increase the overall density of the third polyethylene composition. Therefore, increasing the second polyethylene fraction may thereby increase the high density component and provide a polyethylene composition with a higher overall density. Additionally, increasing the second polyethylene fraction may improve the blocking properties of the third polyethylene composition. Without being bound by theory, it is believed that larger crystals form in the high density fraction, which provide a rough surface. The rough surface may reduce the contact area, and therefore improve the blocking properties of the third polyethylene composition.

In one or more embodiments, the third polyethylene composition may have a local minimum in an elution profile via iCCD in a temperature range of from 65° C. to 85° C. This local minimum may fall between the peak of the first polyethylene fraction and the peak of the second polyethylene fraction.

In one or more embodiments, the third polyethylene area fraction may be an area in the elution profile from 70° C. to 85° C. In additional embodiments, the third polyethylene fraction may be an area in the elution profile in the temperature range of from 70° C. to 80° C. 70° C. to 75° C., 75° C. to 85° C., 75° C. to 80° C., 80° C. to 85° C., or any combinations in the elution profile via iCCD.

According to one or more embodiments, the third polyethylene fraction area may comprise less than 10% of the total area of the elution profile (for example, less than 8%, less than 6%, or less than 4% of the total area of the elution profile). For example, the third polyethylene fraction area may comprise from 4% to 10%, from 4% to 8%, from 4% to 6%, from 6% to 10%, from 6% to 8%, from 8% to 10%, or any combinations of the total area of the elution profile.

In embodiments described herein, the third polyethylene area fraction may be the area in the elution profile from 70° C. to 85° C. In one or more embodiments, the third polyethylene area fraction may be in the area in the elution profile from 70° C. to 85° C., 70° C. to 80° C., 70° C. to 75° C., 75° C. to 85° C., 75° C. to 80° C., 80° C. to 85° C., or any combinations in the elution profile via iCCD.

It may be desirable to minimize the third polyethylene fraction in the temperature range of 70° C. to 85° C., which otherwise shifts the higher density component from the second polyethylene fraction towards a lower temperature range within the elution profile. Without being bound by theory, it is believed that shifting the high density component towards a lower temperature range within the elution profile may prevent the third polyethylene composition from achieving the desired blocking properties.

In one or more embodiments, the fourth polyethylene area fraction may be an area in the elution profile from 20° C. to 35° C. In additional embodiments, the fourth polyethylene fraction may be an area in the elution profile in the temperature range of from 20° C. to 30° C., 20° C. to 25° C., 25° C. to 35° C., 25° C. to 30° C., 30° C. to 35° C., or any combinations in the elution profile via iCCD.

According to one or more embodiments, the fourth polyethylene fraction area may comprise less than 35% of the total area of the elution profile (for example, less than 30%, less than 20%, less than 10%, less than 5%, or even less than 2% of the total area of the elution profile). For example, the fourth polyethylene fraction area may comprise from 0% to 35%, from 0% to 20%, from 0% to 10%, from 0% to 5%, from 5% to 35%, from 5% to 20%, from 5% to 10%, from 10% to 35%, from 10% to 20%, from 20% to 35%, or any combinations of the total area of the elution profile.

In embodiments described herein, the fourth polyethylene area fraction is the area in the elution profile beneath the at least one peak of the fourth polyethylene fraction from 20° C. to 35° C. In one or more embodiments, the fourth polyethylene fraction may have at least one peak in the temperature range of 20° C. to 30° C., 20° C. to 25° C., 25° C. to 35° C., 25° C. to 30° C., 30° C. to 35° C., or any combinations in the elution profile via iCCD.

It may be desired to minimize the fourth polyethylene fraction in the temperature range of 20° C. to 35° C. Without being bound by theory, it is believed that a high amount of the fourth polyethylene fraction may prevent the third polyethylene composition from achieving the desired blocking properties.

In one or more embodiments, the third polyethylene composition may have a local minimum in an elution profile via iCCD in a temperature range of from 30° C. to 40° C. This local minimum may fall between the peak of the fourth polyethylene fraction and the peak of the first polyethylene fraction.

It should be understood that two or more polyethylene fractions may overlap with one another. In one or more embodiments, the first polyethylene area fraction the fourth polyethylene area fraction may overlap.

In one or more embodiments, the third polyethylene composition is formed from the polymerization of ethylene and comonomers such as a C3-C12 alkene. Contemplated comonomers include C6-C9 alkenes, such as 1-octene and 1-hexene. In one or more embodiments the comonomers is 1-octene.

In one or more embodiments, the weight average molecular weight of the first polyethylene fraction may be less than or equal to 225,000 g/mol, such as from 30,000 g/mol to 225,000 g/mol, 60,000 g/mol to 150,000 g/mol, or from 90,000 g/mol to 120,000 g/mol, or any combination of these ranges. Molecular weight of the polyethylene fractions may be calculated based on iCCD results, as described hereinbelow.

In one or more embodiments, the weight average molecular weight of the second polyethylene fraction may be less than or equal to 225,000 g/mol, such as from 25,000 g/mol to 225,000 g/mol, 50,000 g/mol to 150,000 g/mol, from 75,000 g/mol to 125,000 g/mol, or any combination of these ranges. Molecular weight of the polyethylene fractions may be calculated based on iCCD results, as described hereinbelow.

In embodiments, a ratio of the molecular weight of the first polyethylene area fraction to the molecular weight of the total area of the elution profile is from 0.5 to 1.5. In embodiments, the ratio may be from 0.5 to 1.5, 0.5 to 1.0, or 1.0 to 1.5.

Polymerization

Any conventional polymerization processes may be employed to produce the third polyethylene compositions. Such conventional polymerization processes include, but are not limited to, gas phase polymerization processes, slurry polymerization processes, solution polymerization process, using one or more conventional reactors, e.g., loop reactors, isothermal reactors, stirred tank reactors, pipe flow reactors, plug flow reactors, batch reactors in parallel, series, and/or any combinations thereof. The third polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115° C. to 250° C. (e.g., from 115° C. to 210° C.), and at pressures in the range of from 300 psi to 3,000 psi (e.g., from 400 psi to 800 psi). In some embodiments, in a dual reactor, the temperature in the first reactor is in the range of from 115° C. to 190° C. (e.g., from 150° C. to 180° C.), and the second reactor temperature is in the range of 150° C. to 250° C. (e.g., from 180° C. to 220° C.). In other embodiments, in a single reactor, the temperature in the reactor is in the range of from 115 to 250° C. (e.g., from 115° C. to 225° C.).

The residence time in solution phase polymerization process may be in the range of from 2 minutes to 30 minutes (e.g., from 5 minutes to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston. Texas. The resultant mixture of the third polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the third polyethylene composition may be produced via solution polymerization in a dual reactor system, for example a dual loop reactor system, wherein ethylene is polymerized in the presence of one or more catalyst systems and one or more comonomers. In some embodiments, only ethylene is polymerized. Additionally, one or more cocatalysts may be present. In another embodiment, the third polyethylene composition may be produced via solution polymerization in a single reactor system, for example a single loop reactor system, wherein ethylene is polymerized in the presence of two catalyst systems and one or more comonomers.

Catalyst Systems

The same catalyst systems described in connection with production of the first polyethylene composition can be used to produce the polyethylene compositions of the second composition. As set forth in the Examples section, the processes for production of the first polyethylene composition and the second polyethylene composition differ such that the resulting polyethylene compositions have different properties as described herein.

Articles

Embodiments of the present invention also relate to articles, such as laminates and packages, formed from or incorporating oriented, multilayer polyethylene films of the present invention (or from laminates incorporating such films). Such packages can be formed from any of the films or laminates described herein.

Examples of such articles can include flexible packages, pouches, stand-up pouches, and pre-made packages or pouches. In some embodiments, oriented, multilayer polyethylene films or laminates of the present invention can be used for food packages. Examples of food that can be included in such packages include meats, cheeses, cereal, nuts, juices, sauces, pet food, and others. Such packages can be formed using techniques known to those of skill in the art based on the teachings herein and based on the particular use for the package (e.g., type of food, amount of food, etc.).

Embodiments of articles of the present invention can also be laminates incorporating the inventive multilayer films. In some embodiments, a multilayer film according to embodiments of the present invention can be laminated to another film. The other film in such embodiments can be a polyethylene sealant film, polyethylene terephthalate, polypropylene, or a polyamide. A polyethylene sealant film can be a monolayer or multilayer film formed substantially from polyethylene (e.g., comprises greater than 90 weight percent ethylene-based polymers, or greater than 95 weight percent ethylene-based polymers, or greater than 99 weight percent ethylene-based properties) that when heated as part of the laminate structure can seal the laminate to another film, to another laminate, or to itself. Any polyethylene sealant film known to those of ordinary skill in the art based on the teachings herein may be used. When the other film comprises polyethylene terephthalate, polypropylene, or polyamide, the entire film may be formed from polyethylene terephthalate, polypropylene, or polyamide, or the film comprises at least one layer that includes polyethylene terephthalate, polypropylene, or polyamide. Persons having ordinary skill in the art can select films that comprise polyethylene terephthalate, polypropylene, or polyamide for use in such embodiments based on the teachings herein.

Laminates according to embodiments of the present invention can be formed using techniques known to those having ordinary skill in the art based on the teachings herein. For example, the multilayer film can be laminated to the other film using an adhesive. Various adhesive compositions are considered suitable for the adhesives used to make a laminate. These may include polyurethane, epoxy, acrylic, or the like. In one embodiment, the laminate may comprise adhesive layers comprising polyurethane adhesive. The polyurethane adhesive may be solventless, waterborne or solvent based. Furthermore, the polyurethane adhesive may be a two part formulation. The weight or thickness of the adhesive layer can depend on a number of factors including, for example, the desired thickness of the laminate, the type of adhesive used, and other factors. In some embodiments, the adhesive layer is applied at up to 5.0 grams/m$^2$, or from 1.0 to 4.0 g/m$^2$, or from 2.0 to 3.0 g/m$^2$.

Laminates according to some embodiments of the present invention can also be formed by extrusion lamination.

Test Methods

Unless otherwise indicated herein, the following analytical methods are used in describing aspects of the present invention:

Melt Index

Melt indices $I_2$ (or I2) and $I_{10}$ (or I10) were measured in accordance to ASTM D-1238 (method B) at 190° C. and at 2.16 kg and 10 kg load, respectively. Their values are reported in g/10 min.

Density

Samples for density measurement were prepared according to ASTM D4703. Measurements were made, according to ASTM D792, Method B, within one hour of sample pressing.

Conventional Gel Permeation Chromatography (Conv. GPC)

A GPC-IR high temperature chromatographic system from PolymerChar (Valencia, Spain), is equipped with a Precision Detectors (Amherst, MA), 2-angle laser light scattering detector Model 2040, an IR5 infra-red detector and a 4-capillary viscometer, both from PolymerChar. Data collection is performed using PolymerChar Instrument Control software and data collection interface. The system is equipped with an on-line, solvent degas device and pumping system from Agilent Technologies (Santa Clara, CA).

Injection temperature is controlled at 150 degrees Celsius. The columns used are three, 10-micron "Mixed-B" columns from Polymer Laboratories (Shropshire, UK). The solvent used is 1,2,4-trichlorobenzene. The samples are prepared at a concentration of "0.1 grams of polymer in 50 milliliters of solvent." The chromatographic solvent and the sample preparation solvent each contained "200 ppm of butylated hydroxytoluene (BHT)." Both solvent sources are nitrogen sparged. Ethylene-based polymer samples are stirred gently at 160 degrees Celsius for three hours. The injection volume is "200 microliters," and the flow rate is "1 milliliters/minute." The GPC column set is calibrated by running 21 "narrow molecular weight distribution" polystyrene standards. The molecular weight (MW) of the standards ranges from 580 to 8,400,000 g/mole, and the standards are contained in six "cocktail" mixtures. Each standard mixture has at least a decade of separation between individual molecular weights. The standard mixtures are purchased from Polymer Laboratories. The polystyrene standards are prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards are dissolved at 80° C., with gentle agitation, for 30 minutes. The narrow standards mixtures are run first, and in order of decreasing "highest molecular weight component," to minimize degradation. The polystyrene standard peak molecular weights are converted to polyethylene molecular weight using Equation 1 (as described in Williams and Ward, *J. Polym. Sci.*, Polym. Letters, 6, 621 (1968)):

$$M_{polyethylene} = A \times (M_{polystyrene})^B \quad \text{(Eqn. 1)},$$

where M is the molecular weight, A is equal to 0.4316 and B is equal to 1.0.

Number-average molecular weight (Mn(conv gpc)), weight average molecular weight (Mw-conv gpc), and z-average molecular weight (Mz(conv gpc)) are calculated according to Equations 2-4 below.

$$Mn(convgpc) = \frac{\sum_{i=RV_{integration\,start}}^{i=RV_{integration\,end}} (IR_{measurement\,channel_i})}{\sum_{i=RV_{integration\,start}}^{i=RV_{integration\,end}} (IR_{measurement\,channel_i}/M_{PE_i})} \quad \text{(Eqn. 2)}$$

$$Mw(convgpc) = \frac{\sum_{i=RV_{integration\,start}}^{i=RV_{integration\,end}} (M_{PE_i} IR_{measurement\,channel_i})}{\sum_{i=RV_{integration\,start}}^{i=RV_{integration\,end}} (IR_{measurement\,channel_i})} \quad \text{(Eqn. 3)}$$

$$Mz(convgpc) = \frac{\sum_{i=RV_{integration\,start}}^{i=RV_{integration\,end}} (M_{PE_i}^2 IR_{measurement\,channel_i})}{\sum_{i=RV_{integration\,start}}^{i=RV_{integration\,end}} (M_{PE_i} IR_{measurement\,channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation are performed using "GPC One software (version 2.013H)" from PolymerChar.

Creep Zero Shear Viscosity Measurement Method

Zero-shear viscosities are obtained via creep tests, which are conducted on an AR G2 stress controlled rheometer (TA Instruments; New Castle, Del), using "25-mm-diameter" parallel plates, at 190° C. The rheometer oven is set to test temperature for at least 30 minutes, prior to zeroing the fixtures. At the testing temperature, a compression molded sample disk is inserted between the plates, and allowed to come to equilibrium for five minutes. The upper plate is then lowered down to 50 µm (instrument setting) above the desired testing gap (1.5 mm). Any superfluous material is trimmed off, and the upper plate is lowered to the desired gap. Measurements are done under nitrogen purging, at a flow rate of 5 L/min. The default creep time is set for two hours. Each sample is compression-molded into a "2 mm thick x 25 mm diameter" circular plaque, at 177° C., for five minutes, under 10 MPa pressure, in air. The sample is then taken out of the press and placed on a counter top to cool.

A constant low shear stress of 20 Pa is applied for all of the samples, to ensure that the steady state shear rate was low enough to be in the Newtonian region. The resulting steady state shear rates are in the range from $10^{-3}$ to $10^{-4}$ s$^{-1}$ for the samples in this study. Steady state is determined by taking a linear regression for all the data, in the last 10% time window of the plot of "log (J(t)) vs. log(t)," where J(t) is creep compliance and t is creep time. If the slope of the linear regression is greater than 0.97, steady state is considered to be reached, then the creep test is stopped. In all cases in this study, the slope meets the criterion within one hour. The steady state shear rate is determined from the slope of the linear regression of all of the data points, in the last 10% time window of the plot of "ε vs. t," where ε is strain. The creep zero shear viscosity is determined from the ratio of the applied stress to the steady state shear rate.

In order to determine if the sample was degraded during the creep test, a small amplitude oscillatory shear test is conducted before, and after, the creep test, on the same specimen from 0.1 to 100 rad/s. The complex viscosity values of the two tests are compared. If the difference of the viscosity values, at 0.1 rad/s, is greater than 5%, the sample was considered to have degraded during the creep test, and the result is discarded.

Zero-Shear Viscosity Ratio (ZSVR)

The zero-shear viscosity ratio (ZSVR) is defined as the ratio of the zero-shear viscosity (ZSV) of the branched polyethylene material to the ZSV of the linear polyethylene material at the equivalent average molecular wt, according to the equation:

$$ZSVR = \eta_{0B}/\eta_{0L} = \eta_{0B}/(2.29^{-15} \times Mwt^{3.65})$$

The ZSV value is obtained from a creep test at 190° C. via the method described above. The Mwt is determined using conventional gel permeation chromatography, as described above. The correlation between the ZSV of linear polyethylene and its molecular weight was established based on a series of linear polyethylene reference materials. Lower ZSVR indicates lower level of long chain branching.

Branching Measurements Using $^{13}$C NMR

Sample Preparation

The samples are prepared by adding approximately 2.7 g of a 50/50 mixture of tetrachloroethane-d2/orthodichlorobenzene containing 0.025 M Cr(AcAc)$_3$ as a relaxation agent, to a 0.20 to 0.30 g sample in a Norell 1001-710 mm NMR tube. Oxygen is removed by purging the tube with N2 for 1 minute. The samples are dissolved and homogenized by heating the tube and its contents to 120-140° C. using a heating block and vortex mixer. Each sample is visually inspected to ensure homogeneity. The thoroughly mixed samples are not allowed to cool before insertion into the heated NMR sample changer and/or NMR probe.

Data Acquisition Parameters

The data are collected using a Bruker 600 MHz spectrometer equipped with a Bruker 10 mm multinuclear high-temperature CryoProbe. The data are acquired using 1280 transients per data file, a 7.8 sec pulse repetition delay, 90 degree flip angles, and inverse gated decoupling with a sample temperature of 120° C. All measurements are made on non-spinning samples in locked mode. Samples are allowed to thermally equilibrate prior to data acquisition. The $^{13}$C NMR chemical shifts are internally referenced to the EEE triad at 30.0 ppm. The data is processed into a spectrum, appropriate peaks are integrated (quantitating the branches), and then one or more peak integral values are used or averaged for the total branches/1000 C. In the event that no branching is detected, the integrals and signal-to-noise ratio of peaks such as those due to chain ends are used to calculate the limit of detection of the spectrum.

Unsaturation Measurements Using $^1$H NMR

A stock solution (3.26 g) is added to 0.10 to 0.13 g of the polymer sample in a 10 mm NMR tube. The stock solution is either a mixture of tetrachloroethane-d$_2$ (TCE) and perchloroethylene (50:50, w:w) with 0.001M Cr$^{3+}$ or 100% TCE with 0.001M Cr$^{3+}$. The solution in the tube is sparged with N$_2$ for 5 minutes to reduce the amount of oxygen. The sample is dissolved at 120 to 140° C. with periodic vortex mixing. Each $^1$H NMR analysis is run with a 10 mm cryoprobe, at 120° C., on a Bruker AVANCE 600 MHz spectrometer.

Two experiments are run to measure unsaturation: one control and one double presaturation experiment. For the control experiment, the data are processed with an exponential window function with 0.7 Hz line broadening. The signal from residual $^1$H of TCE is set to 100, the integral ($I_{total}$) from about −0.5 to 3 ppm is used as the signal from the whole polymer in the control experiment. The number of total carbons, NC, in the polymer is calculated as follows in Equation 1A:

$$NC = I_{total}/2 \quad \text{(Eqn. 1A)}.$$

For the double presaturation experiment, the data are processed with an exponential window function with 0.7 Hz line broadening, and the baseline is corrected from about 7 to 4 ppm. The signal from residual $^1$H of TCE is set to 100, and the corresponding integrals for unsaturations ($I_{vinylene}$, $I_{trisubstituted}$, $I_{vinyl}$ and $I_{vinylidene}$) are integrated. It is well known to use NMR spectroscopic methods for determining polyethylene unsaturation, for example see Busico, V., et al., *Macromolecules*, 2005, 38, 6988. The number of unsaturation units for vinylene, trisubstituted, vinyl and vinylidene are calculated as follows:

$$N_{vinylene} = I_{vinylene}/2 \quad \text{(Eqn. 2A)},$$

$$N_{trisubstituted} = I_{tribsubstitute} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 total carbons, i.e., all polymer carbons including backbone and branches, are calculated as:

$$N_{vinylene}/1{,}000\ C = (N_{vinylene}/NC)*1{,}000 \quad \text{(Eqn. 6A)},$$

$$N_{trisubstituted}/1{,}000\ C = (N_{trisubstituted}/NC)*1{,}000 \quad \text{(Eqn. 7A)},$$

$$N_{vinyl}/1{,}000C = (N_{vinyl}/NCH_2)*1{,}000 \quad \text{(Eqn. 8A)},$$

$$N_{vinylidene}/1{,}000C = (N_{vinylidene}/NC)*1{,}000 \quad \text{(Eqn. 9A)}.$$

The chemical shift reference is set at 6.0 ppm for the $^1$H signal from residual proton from TCE-d2. The control is run with a ZG pulse, NS=16, DS=2, AQ=1.82s, D1=14s (where D1 is the relaxation delay). The double presaturation experiment is run with a modified pulse sequence, with O1P=1.354 ppm, O2P=0.960 ppm, NS=50, AQ=1.82s, D1=1s (where D1 is the presaturation time), D13=13s (where D13 is the relaxation delay).

Improved Method for Comonomer Content Distribution Analysis (iCCD)

Improved method for comonomer content analysis (iCCD) was developed in 2015 (Cong and Parrott et al., WO2017040127A1), iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2~0.5 mm, catalogue number 10181-3) from EMD Chemicals was obtained (can be used to dry ODCB solvent before). The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 µl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content. Melt index (I$_2$) of 1.0, polydispersity M$_w$/M$_n$ approximately 2.6 by conventional gel permeation chromatography, 1.0 mg/ml) and Eicosane (2 mg/ml) in ODCB, iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed same way as specified previously at 4 mg/mL. The reported elution peak temperatures were linearly fit to the linear equation y=−6.3515x.+101.00, where y represented elution temperature of iCCD and x represented the octene mole %, and $R^2$ was 0.978.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following four steps:

(1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

(2) Each LS datapoint in LS chromatogram is shifted to correct for the interdetector offset before integration.

(3) Baseline subtracted LS and concentration chromatograms are integrated for the whole eluting temperature range of the Step (1). The MW detector constant is calculated by using a known MW HDPE sample in the range of 100,000 to 140,000 Mw and the area ratio of the LS and concentration integrated signals.

(4) Mw of the polymer was calculated by using the ratio of integrated light scattering detector (90 degree angle) to the concentration detector and using the MW detector constant.

Calculation of half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C.

Dynamic Shear Rheology

Samples were compression molded at 190° C., for 6.5 minutes at pressure of 25000 lbs in air, and the plaques were subsequently allowed to cool down on lab bench. Plaque thickness was ~3 mm. Constant temperature frequency sweep measurements were performed on an ARES strain controlled parallel plate rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method had an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic complex viscosity ($\eta^*$), and tan ($\delta$) or tan delta were calculated.

Water Vapor Transmission Rate

Water Vapor Transmission Rate or "WVTR" is measured in accordance with ASTM E-398 at 37° C. and 90% relative humidity.

Oxygen Transmission Rate

Oxygen Transmission Rate or "OTR" is determined in accordance with ASTM D3985 using a Mocon Oxtran OTR testing system at an oxygen content of 100%, a relative humidity of 85%, and a temperature of 23° C.

Dart Impact

After the film was produced, it was conditioned for at least 40 hours at 23° C. (+/−2° C.) and 50% R.H (+/−5), as per ASTM standards. Standard testing conditions are 23° C. (+/−2° C.) and 50% R.H (+/−5), as per ASTM standards.

The sample thickness was measured at the sample center, and the sample then clamped by an annular specimen holder with an inside diameter of 5 inches. The dart was loaded above the center of the sample, and released by either a pneumatic or electromagnetic mechanism.

Testing was carried out according to the 'staircase' method. If the sample failed, a new sample was tested with the weight of the dart reduced by a known and fixed amount. If the sample did not fail, a new sample was tested with the weight of the dart increased by a known amount. After 20 specimens had been tested, the number of failures was determined. If this number was 10, then the test is complete. If the number was less than 10, then the testing continued, until 10 failures had been recorded. If the number was greater than 10, testing was continued, until the total of non-failures was 10. The dart impact value was determined from these data, as per ASTM D1709, and expressed in grams. The test results in the Examples are reported by Method A (Dart Drop Impact of Type A).

The terms "dart drop impact" and "dart impact" are used synonymously herein to refer to this test method.

Secant Modulus (2%)

Secant modulus at 2% strain is measured in the machine direction (MD) and cross direction (CD) with an Instron Universal tester according to ASTM D882-12.

Some embodiments of the invention will now be described in detail in the following Examples.

Examples

First Polyethylene Compositions

The following are examples of first polyethylene compositions that can be used in embodiments of multilayer films of the present invention. First Polyethylene Composition 1 is prepared according to the following process and based on the reaction conditions reported in Table 1.

All raw materials (ethylene monomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent feed is pressurized via a pump to above reaction pressure. The individual catalyst components are manually batch diluted to specified component concentrations with purified solvent and pressured to above reaction pressure. All reaction feed flows are measured with mass flow meters and independently controlled with computer automated valve control systems.

The continuous solution polymerization reactors consist of two liquid full, non-adiabatic, isothermal, circulating, loop reactors which mimic continuously stirred tank reactors (CSTRs) with heat removal. Independent control of all fresh solvent, monomer, hydrogen, and catalyst component feeds to each reactor is possible. The total fresh feed streams to each reactor (solvent, monomer, and hydrogen) are temperature controlled by passing the feed stream through a heat exchanger. The total fresh feed to each polymerization reactor is injected into the reactor at two locations per reactor roughly with equal reactor volumes between each injection location. The fresh feed to the first reactor is controlled typically with each injector receiving half of the total fresh feed mass flow. The fresh feed to the second reactor in series is controlled typically to maintain half of the total ethylene mass flow near each injector, and since the non-reacted ethylene from the first reactor enters the second reactor adjacent to the lower pressure fresh feed this injector usually has less than half of the total fresh feed mass flow to the second reactor.

The catalyst/cocatalyst components for each reactor are injected into the polymerization reactor through specially designed injection stingers. Each catalyst/cocatalyst component is separately injected into the same relative location in the reactor with no contact time prior to the reactor. The primary catalyst component is computer controlled to maintain the individual reactor monomer conversion at the specified target. The cocatalyst components are fed based on calculated specified molar ratios to the primary catalyst component.

The catalyst used in the first reactor is zirconium, [[2,2'''-[[bis[1-methylethyl)germylene]bis(methyleneoxy-κO)]bis[3'',5,5''-tris(1,1-dimethylethyl)-5'-octyl[1,1':3',1''-terphenyl]-2'-olato-κO]](2-)]dimethyl-, having the chemical formula $C_{86}H_{128}F_2GeO_4Zr$ and the following structure ("Catalyst 1"):

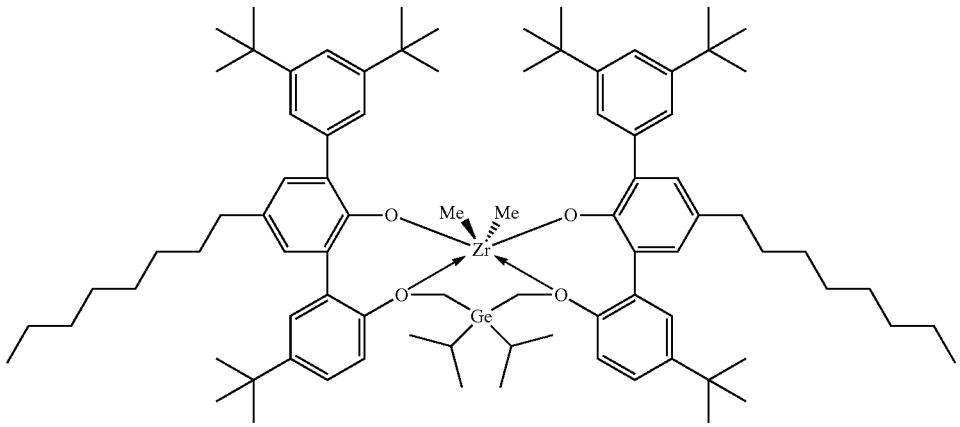

The catalyst used in the second reactor is zirconium, [[2,2'''-[[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)|dimethyl, having the chemical formula $C_{107}H_{154}N_2O_4Si_2Zr$ and the following structure ("Catalyst 2"):

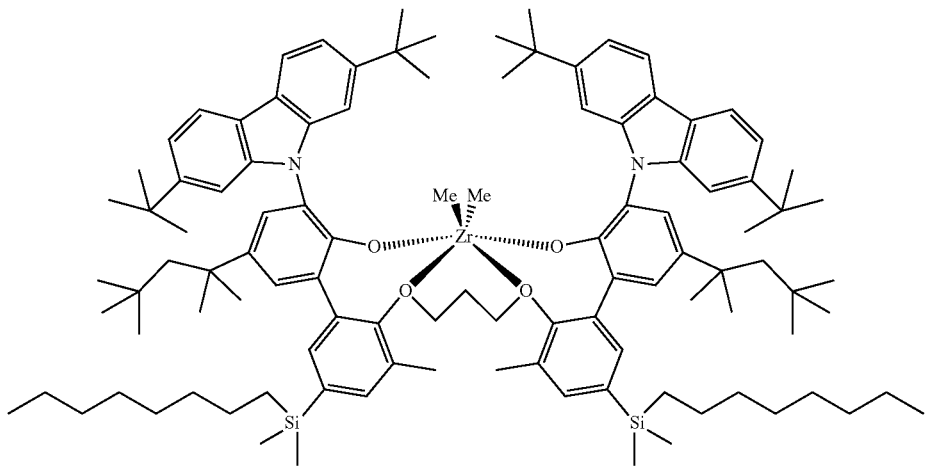

Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified reactor temperature. Circulation around each reactor loop is provided by a pump.

The effluent from the first polymerization reactor (containing solvent, monomer, hydrogen, catalyst components, and dissolved polymer) exits the first reactor loop and passes through a control valve (responsible for controlling the pressure of the first reactor at a specified target) and is injected into the second polymerization reactor of similar design. The final effluent from the second polymerization reactor enters a zone where it is deactivated with the addition of and reaction with a suitable reagent (water). At this same reactor exit location other additives are added for polymer stabilization. This final effluent stream passes through another set of static mixing elements to facilitate the deactivation of the catalyst and dispersion of the additives.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent is recycled back to the reactor after passing through a purification system. A small amount of solvent is purged from the process. Polyethylene Composition 1 was stabilized with minor (ppm) amounts of stabilizers.

The polymerization conditions for First Polyethylene Composition 1 are reported in Table 1. As seen in Table 1, Cocat. 1 (bis(hydrogenated tallow alkyl)methyl, tetrakis (pentafluorophenyl)borate(1-) amine); and Cocat. 2 (modified methyl aluminoxane (MMAO)) are each used as a cocatalyst for Catalyst 1 and Catalyst 2.

First Polyethylene Composition 2 is prepared using the same catalyst system as Polyethylene Composition 1, and using the same process with comparable reaction conditions.

Additional properties of First Polyethylene Composition 1 and First Polyethylene Composition 2 are measured using the Test Methods described above, and are reported in Table 2. The First Polyethylene Fraction refers to the polyethylene component from the first reactor, and the Second Polyethylene Fraction refers to the polyethylene fraction from the second reactor.

TABLE 1

| | | First Polyethylene Composition 1 |
|---|---|---|
| First Reactor Feed Solvent/Ethylene Mass Flow Ratio | g/g | 6.3 |
| First Reactor Feed Hydrogen/Ethylene Mass Flow Ratio | g/g | 1.5E-04 |
| First Reactor Temperature | ° C. | 155 |
| First Reactor Pressure | barg | 50 |
| First Reactor Ethylene Conversion | % | 69.4 |
| First Reactor Catalyst Type | Type | Catalyst 1 |
| First Reactor Co-Catalyst 1 Type | Type | Cocat. 1 |
| First Reactor Co-Catalyst 2 Type | Type | Cocat. 2 |
| First Reactor Co-Catalyst 1 to Catalyst Molar Ratio (B to Zr ratio) | Ratio | 1.5 |
| First Reactor Co-Catalyst 2 to Catalyst Molar Ratio (Al to Zr ratio) | Ratio | 12.5 |
| Percentage of Total Ethylene Feed to First Reactor | wt % | 48.7 |
| Second Reactor Feed Solvent/Ethylene Mass Flow Ratio | g/g | 2.6 |
| Second Reactor Feed Hydrogen/Ethylene Mass Flow Ratio | g/g | 9.2E-04 |
| Second Reactor Temperature | ° C. | 205 |
| Second Reactor Pressure | barg | 50 |
| Second Reactor Ethylene Conversion | % | 91.1 |
| Second Reactor Catalyst Type | Type | Catalyst 2 |
| Second Reactor Co-Catalyst 1 Type | Type | Cocat. 1 |
| Second Reactor Co-Catalyst 2 Type | Type | Cocat. 2 |
| Second Reactor Co-Catalyst 1 to Catalyst Molar Ratio (B to Zr ratio) | mol/mol | 1.8 |
| Second Reactor Co-Catalyst 2 to Catalyst Molar Ratio (Al to Zr ratio) | mol/mol | 22.9 |

TABLE 2

| | Unit | First Polyethylene Comp. 1 | First Polyethylene Comp. 2 |
|---|---|---|---|
| Density | g/cm$^3$ | 0.9668 | 0.9691 |
| $I_2$ | g/10 min | 1.10 | 1.10 |
| $I_{10}/I_2$ | | 13.54 | 15.6 |
| $I_{21}/I_2$ | | 89.8 | 130 |
| Mn (conv · gpc) | g/mol | 11,516 | 10,308 |

TABLE 2-continued

| | Unit | First Polyethylene Comp. 1 | First Polyethylene Comp. 2 |
|---|---|---|---|
| Mw (conv · gpc) | | 112,551 | 113,495 |
| Mz (conv · gpc) | | 423,716 | 441,612 |
| Mw/Mn (conv · gpc) | | 9.77 | 11.01 |
| Mz/Mw (conv · gpc) | | 3.76 | 3.89 |
| Eta* (0.1 rad/s) | Pa · s | 7,921 | 7,934 |
| Eta* (1.0 rad/s) | Pa · s | 6,356 | 6,554 |
| Eta* (10 rad/s) | Pa · s | 3,444 | 3,518 |
| Eta* (100 rad/s) | Pa · s | 1,016 | 1,002 |
| Eta*0.1/Eta*100 | | 7.79 | 7.91 |
| Eta zero | Pa · s | 9,148 | 8,959 |
| Branches (using $^{13}$C NMR) | Per 1000 total Carbons | <0.03 | <0.03 |
| Non-vinyl Unsaturations (using $^1$H NMR) | Per 1,000,000 total Carbons | Not Detected* | Not Detected* |
| ZSVR | | 1.46 | 1.39 |
| First Polyethylene Fraction | | | |
| Wt. % of Polyethylene Composition 1 | % | 35% | 35% |
| Density | g/cm$^3$ | <0.947 | <0.947** |
| I$_2$ | g/10 minutes | ~0.06 | ~0.06** |
| Second Polyethylene Fraction | | | |
| Wt. % of Polyethylene Composition 1 | % | 65% | 65% |
| Density | g/cm$^3$ | 0.979 | 0.979 |
| I$_2$ | g/10 minutes | ~700 | ~700 |

*The limit of detection for this measurement was <3.
**Target

The densities of the first polyethylene fraction for First Polyethylene Composition 1, the overall First Polyethylene Composition 1, and the overall First Polyethylene Composition 2 are measured as described above in the Test Methods section. The density of the first polyethylene fraction for First Polyethylene Composition 2 is the target value. The density of the second polyethylene fraction is calculated using the following blend rule:

$$\text{Density} = \frac{1}{\left(\frac{\text{Amount of First PE Fraction}}{\text{Density of First PE Fraction}}\right) + \left(\frac{\text{Amount of Second PE Fraction}}{\text{Density of Second PE Fraction}}\right)}$$

Additional properties of First Polyethylene Composition 1 and First Polyethylene Composition 2 are evaluated and reported in Table 3.

TABLE 3

| | M$_n$ (conv GPC) | M$_w$ (conv GPC) | M$_z$ (conv GPC) | M$_w$/M$_n$ (conv GPC) | M$_z$/M$_w$ (conv GPC) | ZSVR |
|---|---|---|---|---|---|---|
| Polyethylene Composition 1 | 11,516 | 112,551 | 423,716 | 9.77 | 3.76 | 1.46 |
| Polyethylene Composition 2 | 10,308 | 113,495 | 441,612 | 11.01 | 3.89 | 1.39 |

First Polyethylene Composition 1 can be dry blended with an Hyperform HPN-20E nucleating agent (Milliken Chemical) provided in a masterbatch to target different final loadings of the HPN-20E nucleating agent ("HPN-20E"). One example of a masterbatch with HPN-20E includes 3 weight percent of HPN-20E, 1.5 weight percent silica, 0.5 weight percent hydrotalcite, 5 weight percent antioxidant, and 90 weight percent of a carrier resin. The carrier resin can be a narrow molecular weight distribution high density polyethylene homopolymer having a density of 0.965 g/cm$^3$ and a melt index (I$_2$) of 8.0 g/10 minutes. The Hyperform HPN-20E comprises ~66 weight percent of calcium salt of 1,2-cyclohexanedicarboxylic acid and ~34 weight percent of zinc stearate/zinc palmitate. This masterbatch formed with Hyperform HPN-20E nucleating agent will be referred to as "Nucleating Agent Masterbatch."

In preparing the multilayer films in the Examples below, a First Polyethylene Composition is made using the same catalyst system as Polyethylene Composition 1 and Polyethylene Composition 2, and using the same process with comparable reaction conditions such that the First Polyethylene Composition has properties in line with those of Polyethylene Composition 2. This First Polyethylene Composition is melt blended with the Nucleating Masterbatch to provide a target loading of 750 ppm of Hyperform HPN-20E nucleating agent. References to First Polyethylene Composition 3 in forming the Inventive and Comparative Films below should be understood to be this First Polyethylene Composition incorporating the Nucleating Masterbatch having the 750 ppm target loading of Hyperform HPN-20E.

Second Polyethylene Compositions

The following are examples of second polyethylene compositions that can be used in embodiments of multilayer films of the present invention.

Second Polyethylene Compositions 1-5, which are described according to the one or more embodiments of the detailed description, are prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

In dual series reactor configuration the effluent from the first polymerization reactor (containing solvent, monomer, comonomer, hydrogen, catalyst components, and polymer) exits the first reactor loop and is added to the second reactor loop.

The second reactor effluent enters a zone where it is deactivated with the addition of and reaction with a suitable reagent (water). At this same reactor exit location other additives are added for polymer stabilization (typical antioxidants suitable for stabilization during extrusion and film fabrication like Octadecyl 3,5-Di-Tert-Butyl-4-Hydroxyhydrocinnamate. Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The polymerization conditions for Second Polyethylene Compositions 1-5 are reported in Table 4. Table 5 shows the catalysts referenced in Table 4.

TABLE 4

| Polyethylene Composition | | Second Polyethylene Comp. 1 | Second Polyethylene Comp. 2 | Second Polyethylene Comp. 3 | Second Polyethylene Comp. 4 | Second Polyethylene Comp. 5 |
|---|---|---|---|---|---|---|
| Reactor Configuration | Type | Dual Series | Dual Series | Dual Series | Dual Series | Dual Series |
| Comonomer type | Type | 1-octene | 1-octene | 1-octene | 1-octene | 1-octene |
| First Reactor Feed Solvent/Ethylene Mass Flow Ratio | g/g | 5.2 | 5.3 | 6.6 | 5.2 | 5.3 |
| First Reactor Feed Comonomer/Ethylene Mass Flow Ratio | g/g | 0.31 | 0.31 | 0.32 | 0.31 | 0.30 |
| First Reactor Feed Hydrogen/Ethylene Mass Flow Ratio | g/g | 7.9E−05 | 6.3E−05 | 6.2E−05 | 8.9E−05 | 5.4E−05 |
| First Reactor Temperature | °C. | 175 | 175 | 170 | 175 | 175 |
| First Reactor Pressure | barg | 50 | 50 | 50 | 50 | 50 |
| First Reactor Ethylene Conversion | % | 86.7 | 91.0 | 91.0 | 86.7 | 90.9 |
| First Reactor Catalyst Type | Type | Catalyst Component 1 | Catalyst Component 1 | Catalyst Component 1 | Catalyst Component 1 | Catalyst Component 1 |
| First Reactor Co-Catalyst 1 Type | Type | Co-Catalyst 1 | Co-Catalyst 1 | Co-Catalyst 1 | Co-Catalyst 1 | Co-Catalyst 1 |
| First Reactor Co-Catalyst 2 Type | Type | Co-Catalyst 2 | Co-Catalyst 2 | Co-Catalyst 2 | Co-Catalyst 2 | Co-Catalyst 2 |
| First Reactor Catalyst Metal | Type | Zr | Zr | Zr | Zr | Zr |
| First Reactor Co-Catalyst 1 to Catalyst Molar Ratio (B to Zr ratio) | Ratio | 2.4 | 1.1 | 1.2 | 1.5 | 1.5 |
| First Reactor Co-Catalyst 2 to Catalyst Molar Ratio (Al to Zr ratio) | Ratio | 23.7 | 55.0 | 45.0 | 15.8 | 11.5 |
| First Reactor Residence Time | min | 7.8 | 8.5 | 9.0 | 8.0 | 8.5 |
| Second Reactor Feed Solvent/Ethylene Mass Flow Ratio | g/g | 2.4 | 2.1 | 2.5 | 2.5 | 2.1 |
| Second Reactor Feed Comonomer/Ethylene Mass Flow Ratio | g/g | 0.148 | 0.068 | 0.063 | 0.086 | 0.061 |
| Second Reactor Feed Hydrogen/Ethylene Mass Flow Ratio | g/g | 3.3E−04 | 1.1E−03 | 3.1E−04 | 3.1E−04 | 1.1E−03 |

TABLE 4-continued

| Polyethylene Composition | | Second Polyethylene Comp. 1 | Second Polyethylene Comp. 2 | Second Polyethylene Comp. 3 | Second Polyethylene Comp. 4 | Second Polyethylene Comp. 5 |
|---|---|---|---|---|---|---|
| Second Reactor Temperature | ° C. | 200 | 200 | 200 | 200 | 200 |
| Second Reactor Pressure | barg | 51 | 50 | 50 | 50 | 50 |
| Second Reactor Ethylene Conversion | % | 85.1 | 74.2 | 88.0 | 85.0 | 84.2 |
| Second Reactor Catalyst Type | Type | Catalyst Component 2 | Catalyst Component 2 | Catalyst Component 2 | Catalyst Component 2 | Catalyst Component 2 |
| Second Reactor Co-Catalyst 1 Type | Type | Co-Catalyst 1 | Co-Catalyst 1 | Co-Catalyst 1 | Co-Catalyst 1 | Co-Catalyst 1 |
| Second Reactor Co-Catalyst 2 Type | Type | Co-Catalyst 2 | Co-Catalyst 2 | Co-Catalyst 2 | Co-Catalyst 2 | Co-Catalyst 2 |
| Second Reactor Catalyst Metal | Type | Zr | Zr | Zr | Zr | Zr |
| Second Reactor Co-Catalyst 1 to Catalyst Molar Ratio (B to Metal ratio) | mol/mol | 1.1 | 10.0 | 6.7 | 13.3 | 17.1 |
| Second Reactor Co-Catalyst 2 to Catalyst Molar Ratio (Al to Metal ratio) | mol/mol | 1443.4 | >100.0 | >100.0 | >100.0 | >100.0 |
| Second Reactor Residence Time | min | 5.6 | 5.7 | 5.4 | 5.6 | 5.7 |
| Percentage of Total Ethylene Feed to First Reactor | wt % | 56.9 | 52.4 | 41.5 | 56.9 | 52.5 |

TABLE 5

| | |
|---|---|
| Catalyst component 1 | Zirconium, dimethyl[[2,2'''-[[bis[1-methylethyl)germylene]bis(methyleneoxy-kO)]bis[3'',5,5''-tris(1,1-dimethylethyl)-5'-octyl[1,1':3',1''-terphenyl]-2'-olato-kO]](2-)] |
| Catalyst component 2 | Zirconium, dimethyl [[2,2'''-[1,3-propanediylbis(oxy-kO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-kO]]2-)]- |
| Catalyst component 3 | Hafnium, [[2',2'''-[1,2-cyclohexanediylbis(methyleneoxy-.kappa.O)]bis[3-(9H-carbazol-9-yl)-5-methyl[1,1'-biphenyl]-2-olato-.kappa.O]](2-)]dimethyl- |
| Catalyst component 4 | Catalyst component 4 comprised a Ziegler-Natta type catalyst). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of EtAlCl2 in heptane, and a solution of Ti(O-iPr)4 in heptane, to yield a composition containing a magnesium concentration of 0.20M, and a ratio of Mg/Al/Ti of 40/12.5/3. An aliquot of this composition was further diluted with ISOPAR-E, to yield a final concentration of 500 ppm Ti in the slurry. While being fed to, and prior to entry into, the polymerization reactor, the catalyst premix was contacted with a dilute solution of Et3Al, in the molar Al to Ti ratio specified in Table XX, to give the active catalyst. |
| Co-catalyst 1 | bis(hydrogenated tallow alkyl)methylammonium tetrakis(pentafluorophenyl)borate(1-) |
| Co-catalyst 2 | modified methyl aluminoxane |
| Co-catalyst 3 | Tri-ethyl aluminum |

Second Polyethylene Composition 6, which is described according to the one or more embodiments of the detailed description, are prepared by a method and utilizing the catalysts and reactors described below.

All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A two reactor system is used in a parallel configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to each reactor (solvent, monomer, comonomer, and hydrogen) is temperature controlled to maintain a single solution phase by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stingers. The primary catalyst component feed is computer controlled to maintain each reactor monomer conversion at the specified targets. The cocatalyst components are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

The effluent streams from the first and the second polymerization reactors are combined prior to any additional processing. This final combined reactor effluent enters a zone where it is deactivated with the addition of and reaction with a suitable reagent (water). At this same reactor exit location other additives are added for polymer stabilization (typical antioxidants suitable for stabilization during extrusion and blown film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The polymerization conditions for Second Polyethylene Composition 6 is reported in Table 6. Table 5 shows the catalysts referenced in Table 6.

TABLE 6

| Polyethylene Composition | | Second Polyethylene Composition 6 |
|---|---|---|
| Reactor Configuration | Type | Dual Parallel |
| Comonomer type | Type | 1-octene |
| First Reactor Feed Solvent/Ethylene Mass Flow Ratio | g/g | 10.4 |
| First Reactor Feed Comonomer/Ethylene Mass Flow Ratio | g/g | 0.33 |
| First Reactor Feed Hydrogen/Ethylene Mass Flow Ratio | g/g | 6.6E−05 |
| First Reactor Temperature | ° C. | 160 |
| First Reactor Pressure | barg | 50 |
| First Reactor Ethylene Conversion | % | 90.6 |
| First Reactor Catalyst Type | Type | Catalyst component 1 |
| First Reactor Co-Catalyst 1 Type | Type | Co-catalyst 1 |
| First Reactor Co-Catalyst 2 Type | Type | Co-catalyst 2 |
| First Reactor Catalyst Metal | Type | Zr |
| First Reactor Co-Catalyst 1 to Catalyst Molar Ratio (B to Metal ratio) | Ratio | 2.0 |
| First Reactor Co-Catalyst 2 to Catalyst Molar Ratio (Al to Metal ratio) | Ratio | 46.7 |

TABLE 6-continued

| Polyethylene Composition | | Second Polyethylene Composition 6 |
|---|---|---|
| First Reactor Residence Time | min | 7.7 |
| Second Reactor Feed Solvent/Ethylene Mass Flow Ratio | g/g | 2.5 |
| Second Reactor Feed Comonomer/Ethylene Mass Flow Ratio | g/g | 0.048 |
| Second Reactor Feed Hydrogen/Ethylene Mass Flow Ratio | g/g | 4.0E−04 |
| Second Reactor Temperature | ° C. | 195 |
| Second Reactor Pressure | barg | 50 |
| Second Reactor Ethylene Conversion | % | 93.7 |
| Second Reactor Catalyst Type | Type | Catalyst component 2 |
| Second Reactor Co-Catalyst 1 Type | Type | Co-catalyst 1 |
| Second Reactor Co-Catalyst 2 Type | Type | Co-catalyst 2 |
| Second Reactor Catalyst Metal | Type | Zr |
| Second Reactor Co-Catalyst 1 to Catalyst Molar Ratio (B to Metal ratio) | mol/mol | 12.0 |
| Second Reactor Co-Catalyst 2 to Catalyst Molar Ratio (Al to Metal ratio) | mol/mol | >100.0 |
| Second Reactor Residence Time | min | 22.9 |
| Percentage of Total Ethylene Feed to First Reactor | wt % | 47.7 |

Figure 2:
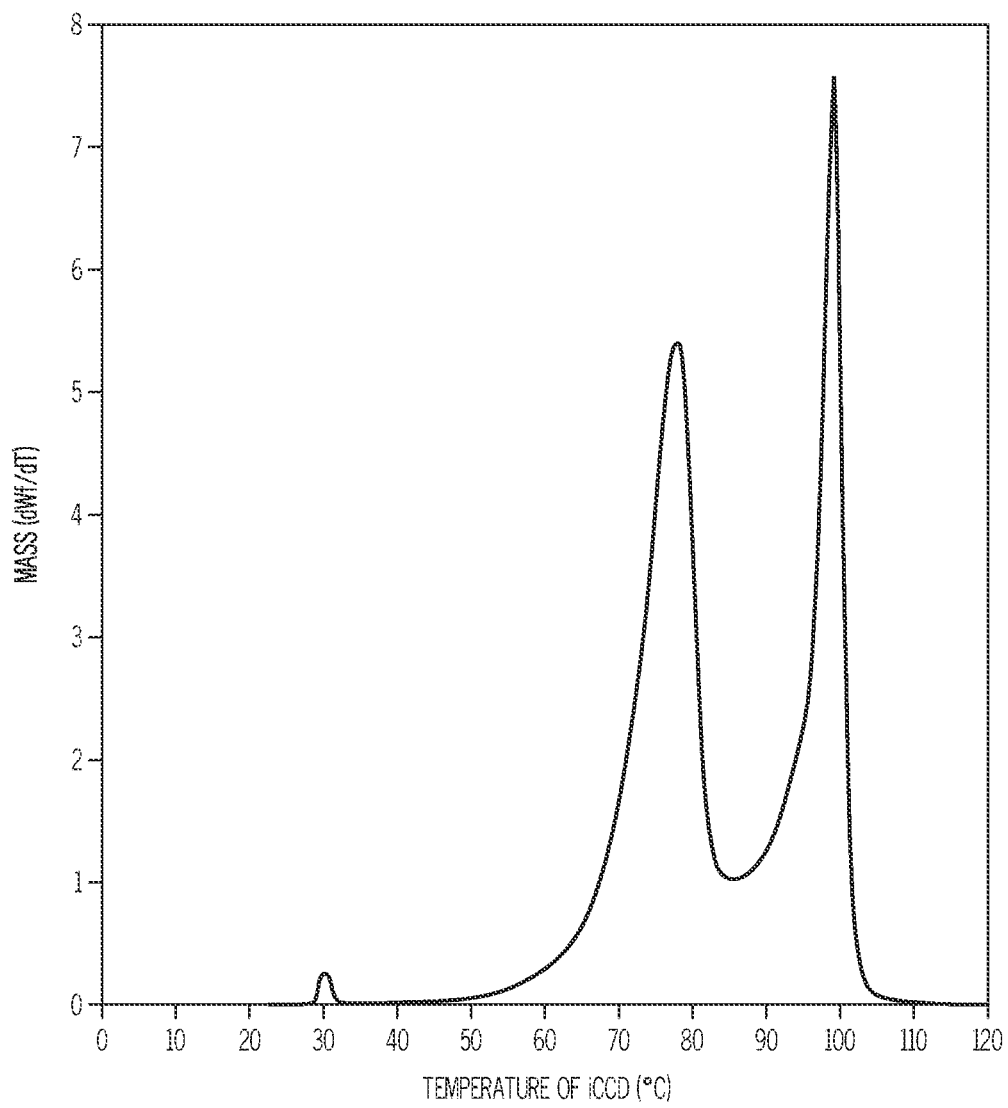
FIG. 2 graphically depicts the iCCD elution profile of a second polyethylene composition, according to one or more embodiments presently described.

Second Polyethylene Compositions 1, 3, 5, and 6 are analyzed by iCCD. The iCCD data of Second Polyethylene Composition 5 is provided in FIG. 2. Additional data generated from the iCCD testing of these samples is provided in Tables 7A and 7B. Specifically. Tables 7A and 7B includes analysis of the iCCD data, including the areas of the respective first and second polyethylene fractions (45-87° C. and 95-120° C.). Additional data is also provided for these samples including overall density, melt index, weight average molecular weight in the second PE fraction. These properties are based on monolayer blown films consisting completely of each polyethylene sample.

TABLE 7A

| PE Sample Unit | Overall density (g/cm3) | Overall MI g/10 min | First PE fraction area (45-87° C.) % | Second PE fraction area (95-120° C.) % | First PE fraction area to Second PE fraction area ratio |
|---|---|---|---|---|---|
| 1 | 0.925 | 0.85 | 55.97% | 29.09% | 1.92 |
| 3 | 0.928 | 0.85 | 45.24% | 43.81% | 1.03 |
| 5 | 0.928 | 0.85 | 57.96% | 29.23% | 1.98 |
| 6 | 0.93 | 0.50 | 47.08% | 44.07% | 1.07 |

TABLE 7B

| PE Sample Unit | Mw of second PE fraction (g/mol) | Overall polyethylene composition MWD | First PE fraction melt index g/10 min |
|---|---|---|---|
| 1 | 60444 | 3.5 | 0.15 |
| 3 | 61805 | 3.5 | 0.1 |
| 5 | 45684 | 4.6 | 0.15 |
| 6 | 54882 | 4 | 0.05 |

Inventive Films 1-3 and Comparative Films A-E

Inventive Films and Comparative Films are made using First Polyethylene Composition 3 and Second Polyethylene Composition 5 from above. In addition, the polyethylene resins shown in Table 8 are used to prepare the Inventive Film and Comparative Films discussed below. Each of the resins are commercially available from The Dow Chemical Company.

TABLE 8

| Commercial Name | Type | I₂ (g/10 min) | Density (g/cc) |
|---|---|---|---|
| DOWLEX ™ GM 8051 | LLDPE | 0.9 | 0.921 |
| ELITE ™ 5400 | Enhanced LLDPE | 1 | 0.916 |
| INNATE ™ ST 50 | Enhanced LLDPE | 0.85 | 0.918 |

Inventive Film 1 and Comparative 1Films A-C

Inventive Film 1 and Comparative Films A-C are three-layer (A/B/A) coextruded films that are prepared as follows. Inventive Film 1 and Comparative Films A-C have the following structures:

TABLE 9

| Film | Structure | Overall Density (g/cm³) |
|---|---|---|
| Inventive Film 1 | Layer A (30 μm): Second Polyethylene Composition 5<br>Layer B (30 μm): First Polyethylene Composition 3<br>Layer A (30 μm): Second Polyethylene Composition 5 | 0.942 |
| Comparative Film A | Layer A (30 μm): DOWLEX ™ GM 8051<br>Layer B (30 μm): First Polyethylene Composition 3<br>Layer A (30 μm): DOWLEX ™ GM 8051 | 0.937 |
| Comparative Film B | Layer A (30 μm): ELITE ™ 5400<br>Layer B (30 μm): First Polyethylene Composition 3<br>Layer A (30 μm): ELITE ™ 5400 | 0.934 |
| Comparative Film C | Layer A (30 μm): INNATE ™ ST 50<br>Layer B (30 μm): First Polyethylene Composition 3<br>Layer A (30 μm): INNATE ™ ST 50 | 0.935 |

The films are produced using a Dr. Collin 3-layer coextrusion blown film line. The line was comprised of three 25:1 L/D single screw extruders, equipped with grooved feed zones. Screw diameters are 25 mm for the two outer layers (Layers A) extruders and 30 mm for the inner layer extruder (formed from Layer B). The melt temperature is 190° C.-210° C. The die diameter is 80 mm, and the die gap is 1.8 mm. The blow-up ratio is 2.5:1. The output rate is 22.42 kg/hour. The temperature profile is 190/210/220/235/235/235/2350° C. The nominal thickness of each film is 90 microns with a layer distribution of A(33%)/B(34%)/A (33%).

Dart drop impact, 2% secant modulus in the machine direction, water vapor transmission rate, and oxygen transmission rate are measured using the methods described above. The results are shown in Table 10.

TABLE 10

| Film | Dart Drop (g) | 2% Secant Modulus, MD (MPa) | WVTR (g/m²/day) | OTR (cm³/m²/day) |
|---|---|---|---|---|
| Inventive Film 1 | 639 | 590 | 0.85 | 233 |
| Comparative Film A | 432 | 443 | 1.03 | 513 |
| Comparative Film B | 494 | 501 | 0.92 | 407 |
| Comparative Film C | 548 | 553 | 0.84 | 329 |

As shown in Table 10, the combination of the First Polyethylene Composition and the Second Polyethylene Composition provided a unique combination of stiffness (secant modulus) and toughness (dart drop impact). In addition, the inclusion of the First Polyethylene Composition having high density provided notable improvement in water vapor transmission rate and oxygen transmission rate.

Inventive Layers 2-3 and Comparative Films D-E

Inventive Films 2-3 and Comparative Films D-E are five-layer (A/B/C/D/E) coextruded films that are prepared as follows. Inventive Film 2 and Comparative Films D-F have the following structures:

TABLE 11

| Film | Structure | Overall Density (g/cm³) |
|---|---|---|
| Inventive Film 2 | Layer A (20 μm): Second Polyethylene Composition 5<br>Layer B (10 μm): DOWLEX ™ GM 8051<br>Layer C (30 μm): First Polyethylene Composition 3<br>Layer D (10 μm): DOWLEX ™ GM 8051<br>Layer E (20 μm): Second Polyethylene Composition 5 | 0.940 |
| Inventive Film 3 | Layer A (20 μm): INNATE ™ ST 50<br>Layer B (10 μm): Second Polyethylene Composition 5<br>Layer C (30 μm): First Polyethylene Composition 3<br>Layer D (10 μm): Second Polyethylene Composition 5<br>Layer E (20 μm): INNATE ™ ST 50 | 0.937 |

TABLE 11-continued

| Film | Structure | Overall Density (g/cm³) |
|---|---|---|
| Comparative Film D | Layer A (20 μm): INNATE ™ ST 50<br>Layer B (10 μm): DOWLEX ™ GM 8051<br>Layer C (30 μm): First Polyethylene Composition 3<br>Layer D (10 μm): DOWLEX ™ GM 8051<br>Layer E (20 μm): INNATE ™ ST 50 | 0.936 |
| Comparative Film E | Layer A (15 μm): Second Polyethylene Composition 5<br>Layer B (15 μm): First Polyethylene Composition 3<br>Layer C (30 μm): First Polyethylene Composition 3<br>Layer D (20 μm): Second Polyethylene Composition 5<br>Layer E (10 μm): INNATE ™ ST 50 | 0.947 |

The films are produced using a Dr. Collin 5-layer coextrusion blown film line. The line was comprised of five 25:1 L/D single screw extruders, equipped with grooved feed zones. Screw diameters are 30 mm for the two outer layers (Layers A and E) extruders and 25 mm for the inner layer extruders (Layers B-D). The melt temperature is 190' C-210° C. The die diameter is 80 mm, and the die gap is 1.8 mm. The blow-up ratio is 2.5:1. The output rate is 22.42 kg/hour. The temperature profile is 190/210/220/235/235/235/235° C. The nominal thickness of each film is 90 microns with a layer distribution as specified in Table 11.

Dart drop impact, 2% secant modulus in the machine direction, water vapor transmission rate, and oxygen transmission rate are measured using the methods described above. The results are shown in Table 12.

TABLE 12

| Film | Dart Drop (g) | 2% Secant Modulus, MD (MPa) | WVTR (g/m²/day) | OTR (cm³/m²/day) |
|---|---|---|---|---|
| Inventive Film 2 | 639 | 590 | 0.79 | 371 |
| Inventive Film 3 | 566 | 579 | 0.81 | 371 |
| Comparative Film D | 608 | 534 | 0.87 | 391 |
| Comparative Film E | 209 | 722 | 0.61 | 275 |

As shown in Table 12, the combination of the First Polyethylene Composition and the Second Polyethylene Composition provided a unique combination of stiffness (secant modulus) and toughness (dart drop impact), especially when the Second Polyethylene Composition is present at 20 weight percent or higher. Moreover, a good balance of stiffness (secant modulus) and toughness (dart drop impact) is achieved when the amount of the First Polyethylene Composition is below 40 weight percent. For example, in Comparative Film E, the First Polyethylene Composition was present at 50 weight percent, and the dart drop impact value dropped significantly.

Other Inventive Examples

As noted above, in some embodiments, multilayer films of the present invention include an outer layer, which is a sealant layer that comprises a third polyethylene composition. For example, in the above Inventive Films, one of the outer layers (e.g., Layer A) could be a sealant layer that comprises the third polyethylene compositions. Embodiments of the third polyethylene compositions can be prepared as follows.

Third Polyethylene Compositions 1-3, which are described according to the one or more embodiments of the detailed description, may be prepared by a method and utilizing the catalysts and reactors described below.

All raw materials (monomer and comonomer) and the process solvent (a narrow boiling range high-purity isoparaffinic solvent, Isopar-E) were purified with molecular sieves before introduction into the reaction environment. Hydrogen was supplied pressurized as a high purity grade and was not further purified. The reactor monomer feed stream was pressurized via a mechanical compressor to above reaction pressure. The solvent and comonomer feed was pressurized via a pump to above reaction pressure. The individual catalyst components were manually batch diluted with purified solvent and pressured to above reaction pressure. All reaction feed flows were measured with mass flow meters and independently controlled with computer automated valve control systems.

A two reactor system is used. Each continuous solution polymerization reactor utilized a liquid full, non-adiabatic, isothermal, circulating, loop reactor, which mimicked a continuously stirred tank reactor (CSTR) with heat removal. Independent control of all fresh solvent, monomer, comonomer, hydrogen, and catalyst component feeds were possible. The total fresh feed stream to each reactor (solvent, monomer, comonomer, and hydrogen) was temperature controlled to maintain a single solution phase by passing the feed stream through a heat exchanger. The total fresh feed to each polymerization reactor was injected into the reactor at two locations with approximately equal reactor volumes between each injection location. The fresh feed was controlled so that each injector received half of the total fresh feed mass flow. The catalyst components were injected into the polymerization reactor through injection stingers. The catalyst feed was computer controlled to maintain each reactor monomer conversion at the specified targets. The cocatalyst components were fed based on calculated specified molar ratios to the primary catalyst component. Immediately following each reactor feed injection location, the feed streams were mixed with the circulating polymerization reactor contents with static mixing elements. The contents of each reactor were continuously circulated through heat exchangers responsible for removing much of the heat of reaction and with the temperature of the coolant side responsible for maintaining an isothermal reaction environment at the specified temperature. Circulation around each reactor loop was provided by a pump.

The effluent from the first polymerization reactor (containing solvent, monomer, comonomer, hydrogen, catalyst components, and polymer) exited the first reactor loop and was added to the second reactor loop.

The second reactor effluent entered a zone where it was deactivated with the addition of and reaction with a suitable reagent (water). At this same reactor exit location, other additives were added for polymer stabilization (typical antioxidants suitable for stabilization during extrusion and film fabrication like Octadecyl 3,5-Di-Tert-Butyl-4-Hydroxyhydrocinnamate, Tetrakis(Methylene(3,5-Di-Tert-Butyl-4-Hydroxyhydrocinnamate))Methane, and Tris(2,4-Di-Tert-Butyl-Phenyl) Phosphite).

Following catalyst deactivation and additive addition, the reactor effluent entered a devolatization system where the polymer was removed from the non-polymer stream. The isolated polymer melt was pelletized and collected. The non-polymer stream passed through various pieces of equipment, which separated most of the ethylene that was removed from the system. Most of the solvent and unreacted comonomer was recycled back to the reactor after passing through a purification system. A small amount of solvent and comonomer was purged from the process.

The reactor stream feed data flows that correspond to the values in Table 13. The data are presented such that the complexity of the solvent recycle system was accounted for and the reaction system can be treated more simply as a once through flow diagram. Table 14 shows the catalysts referenced in Table 13.

TABLE 13

| Polyethylene Composition | | Third Polyethylene Comp. 1 | Third Polyethylene Comp. 2 | Third Polyethylene Comp. 3 |
|---|---|---|---|---|
| Reactor Configuration | Type | Dual Series | Dual Series | Dual Series |
| Comonomer type | Type | 1-octene | 1-octene | 1-octene |
| First Reactor Feed Solvent/Ethylene Mass Flow Ratio | g/g | 3.7 | 3.7 | 3.8 |
| First Reactor Feed Comonomer/Ethylene Mass Flow Ratio | g/g | 0.86 | 0.86 | 0.75 |
| First Reactor Feed Hydrogen/Ethylene Mass Flow Ratio | g/g | 1.5E−04 | 1.8E−04 | 1.8E−04 |
| First Reactor Temperature | °C. | 165 | 165 | 165 |
| First Reactor Pressure | barg | 50 | 50 | 50 |
| First Reactor Ethylene Conversion | % | 86.1 | 87.1 | 91.5 |
| First Reactor Catalyst Type | Type | Catalyst Component B | Catalyst Component B | Catalyst Component B |
| First Reactor Catalyst Metal | Type | Zr | Zr | Zr |
| First Reactor Co-Catalyst 1 Type | Type | Co-Catalyst A | Co-Catalyst A | Co-Catalyst A |
| First Reactor Co-Catalyst 2 Type | Type | Co-Catalyst B | Co-Catalyst B | Co-Catalyst B |
| First Reactor Co-Catalyst 1 to Catalyst Molar Ratio (B to Metal ratio) | Ratio | 1.2 | 1.2 | 1.2 |
| First Reactor Co-Catalyst 2 to Catalyst Molar Ratio (Al to Metal ratio) | Ratio | 12.7 | 14.6 | 153.0 |
| First Reactor Residence Time | min | 10.6 | 10.8 | 1.1,7 |
| Second Reactor Feed Solvent/Ethylene Mass Flow Ratio | g/g | 1.9 | 1.9 | 2.0 |
| Second Reactor Feed Comonomer/Ethylene Mass Flow Ratio | g/g | 0.271 | 0.268 | 0.194 |
| Second Reactor Feed Hydrogen/Ethylene Mass Flow Ratio | g/g | 0.2E−04 | 4.1E−05 | 3.6E−04 |
| Second Reactor Temperature | °C. | 190 | 190 | 190 |
| Second Reactor Pressure | barg | 50 | 50 | 50 |
| Second Reactor Ethylene Conversion | % | 84.4 | 84.3 | 85.6 |
| Second Reactor Catalyst Type | Type | Catalyst Component C | Catalyst Component C | Catalyst Component E |
| Second Reactor Catalyst Metal | Type | Hf | Hf | Zr |
| Second Reactor Co-Catalyst 1 Type | Type | Co-Catalyst A | Co-Catalyst A | Co-Catalyst A |
| Second Reactor Co-Catalyst 2 Type | Type | Co-Catalyst B | Co-Catalyst B | Co-Catalyst B |
| Second Reactor Co-Catalyst 1 to Catalyst Molar Ratio (B to Metal ratio) | mol/mol | 6.2 | 6.6 | 6.0 |
| Second Reactor Co-Catalyst 2 to Catalyst Molar Ratio (Al to Metal ratio) | mol/mol | 235.0 | 243.0 | 101.0 |
| Second Reactor Residence Time | min | 7.5 | 7.5 | 7.7 |
| Percentage of Total Ethylene Feed to First Reactor | wt % | 57.6 | 56.6 | 53.1 |

TABLE 14
| | |
|---|---|
| Catalyst component B | 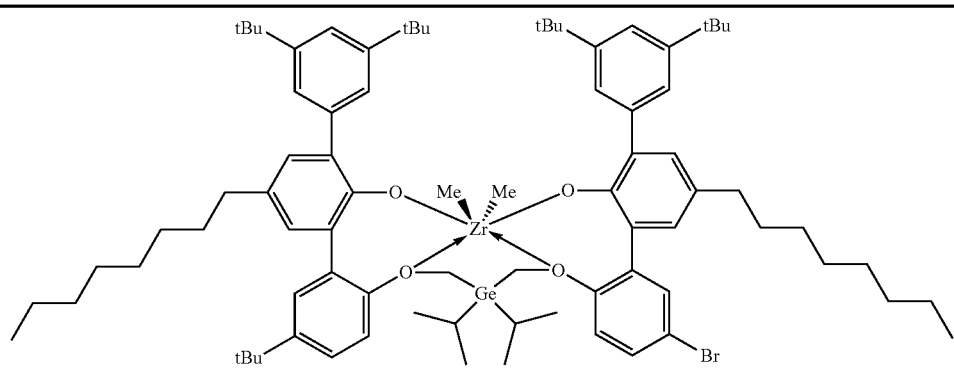 |
| Catalyst component C | 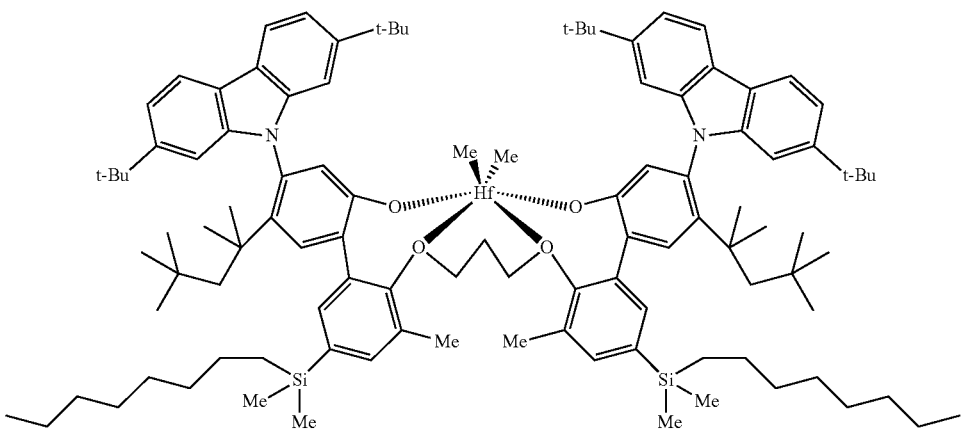 |
| Catalyst component E | 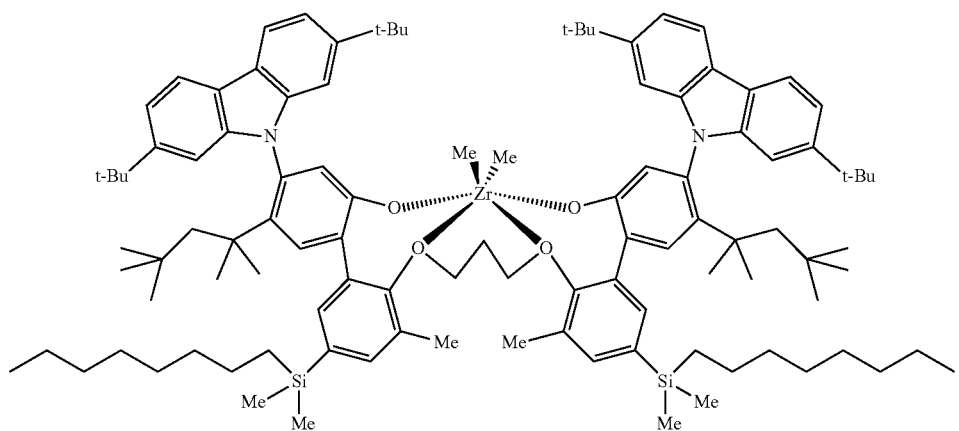 |
| Co-catalyst A | 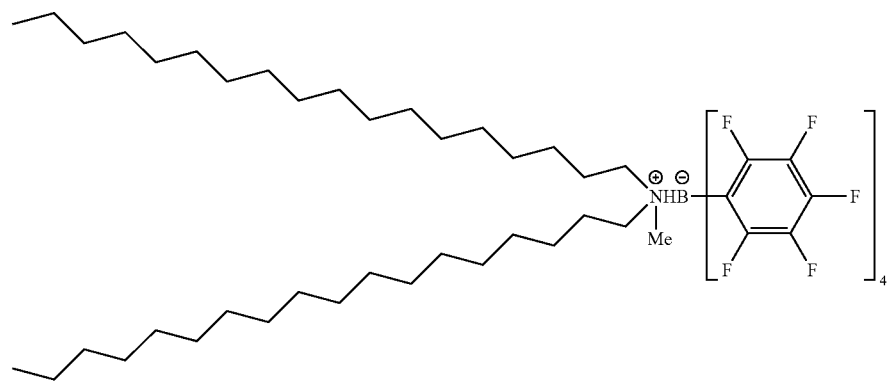 |
| Co-catalyst B | modified methyl aluminoxane |

Third Polyethylene Compositions 1-3 are analyzed by iCCD. The data generated from the iCCD testing of all samples (Third Polyethylene Compositions 1-3) is provided in Tables 15A and 15B. Specifically, Table 38A includes analysis of the iCCD data in temperature increments of (5° C.).

TABLE 15A

| Sample ID | 25° C.-70° C. | 70° C.-85° C. | 85° C.-120° C. |
|---|---|---|---|
| Third Polyethylene Comp. 1 | 60.29% | 3.15% | 36.56% |
| Third Polyethylene Comp. 2 | 60.15% | 2.70% | 37.16% |
| Third Polyethylene Comp. 3 | 59.55% | 4.65% | 35.80% |

Table 15B further delineates the iCCD data to include the areas of the respective polyethylene fractions (25° C.-35° C., 35° C.-70° C., 70° C.-85° C., and 85° C.-120° C.).

TABLE 15B

| | Weight Percent (wt. %) in Each Temperature Zone | | | |
|---|---|---|---|---|
| Sample ID | 20° C.-35° C. | 35° C.-70° C. | 70° C.-85° C. | 85° C.-120° C. |
| Third Polyethylene Comp. 1 | 10.08% | 50.21% | 3.15% | 36.56% |
| Third Polyethylene Comp. 2 | 11.88% | 48.27% | 2.70% | 37.16% |
| Third Polyethylene Comp. 3 | 25.92% | 33.63% | 4.65% | 35.80% |

Table 16 provides additional data for Third Polyethylene Compositions 1-3 including overall density, melt index, ZSVR, and the ratio of the first fraction molecular weight to the overall molecular weight. These properties were measured based on the test methods described herein.

TABLE 16

| Third PE Comp. No. | Density (g/cm³) | Melt Index (g/10 min) | ZSVR | Overall Mw (LS90) (g/mol) | First Fraction Mw | Higher Density Fraction Mw | Ratio of First Fraction Molecular Weight to Overall Molecular Weight | $M_w/M_n$ |
|---|---|---|---|---|---|---|---|---|
| 1 | 0.9033 | 1.0 | 1.38 | 119,555 | 127,135 | 125,491 | 1.06 | 2.22 |
| 2 | 0.9035 | 1.0 | 1.27 | 119,224 | 109,963 | — | 0.92 | 2.18 |
| 3 | 0.904 | 3.0 | 1.08 | 90,590 | 95,944 | 99,409 | 1.06 | 2.32 |

As stated previously in this disclosure, tan delta (tan δ) is a measure of how close a material is to a perfectly-elastic solid (where d=0°, tan delta=0) or of how close a material is to a perfectly-Newtonian liquid (where d=90°, tan delta≈infinity). Thus, lower values of tan d reflect greater elasticity. Tan d is a function of LCB and MWD at the same overall molecular weight. Higher tan d values indicate lower LCB.

TABLE 17

| Sample | Tan δ (at 0.1 radian/sec, 190° C.) |
|---|---|
| Third Polyethylene Comp. 1 | 27.3 |
| Third Polyethylene Comp. 2 | 22.3 |
| Third Polyethylene Comp. 3 | 80.9 |

That which is claimed:

1. A multilayer film comprising:
    (a) a first polyethylene composition that comprises:
        (1) from 25 to 37 percent by weight of a first polyethylene fraction having a density in the range of 0.935 to 0.947 g/cm³ and a melt index (12) of less than 0.1 g/10 minutes; and
        (2) from 63 to 75 percent by weight of a second polyethylene fraction; and
    wherein the first polyethylene composition has less than 0.10 branches per 1,000 carbon atoms when measured using 13C NMR, wherein the density of the first polyethylene composition is at least 0.965 g/cm³, and wherein the melt index (12) of the first polyethylene composition is 0.5 to 10 g/10 minutes; and
    (b) a second polyethylene composition that comprises:
        (1) a first polyethylene fraction having a single peak in a temperature range of 45° C. to 87° C. in an elution profile via improved comonomer composition distribution (iCCD) analysis method, wherein a first polyethylene area fraction is an area in the elution profile beneath the single peak of the first polyethylene fraction between 45 and 87° C.; and
        (2) a second polyethylene fraction having a single peak in a temperature range of 95° C. to 120° C. in the elution profile via iCCD analysis method and wherein a second polyethylene area fraction is an area in the elution profile beneath the single peak of the second polyethylene fraction between 95° C. and 120° C.;
    wherein the second polyethylene composition has a density of 0.924 g/cm³ to 0.936 g/cm³ and a melt index (12) of 0.25 g/10 minutes to 2.0 g/10 minutes, wherein the second polyethylene fraction area comprises at least 40% of the total area of the elution profile, wherein a ratio of the first polyethylene fraction area to the second polyethylene fraction area is 0.75 to 2.5, and wherein the width of the single peak of the second polyethylene fraction at 50 percent peak height is less than 5.0° C.; wherein the multilayer film comprises 40 weight percent or less of the first polyethylene composition based on the total weight of the multilayer film.

2. The multilayer film of claim 1, wherein at least one layer of the multilayer film comprises the first polyethylene composition and the second polyethylene composition.

3. The multilayer film of claim 1, wherein the layer comprising the first polyethylene composition further comprises 20 to 5000 ppm, based on the total weight of the layer of a nucleating agent, wherein the nucleating agent comprises a calcium salt of 1,2-cyclohexanedicarboxylic acid or sodium 4-[(4-chlorobenzoyl) amino] benzoate.

4. The multilayer film of claim 1, wherein an outer layer of the film comprises a third polyethylene composition, the third polyethylene composition comprising:
   (a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile;
   (b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and
   (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and
   wherein the third polyethylene composition has a density of 0.880 g/cm$^3$ to 0.910 g/cm$^3$, a melt index ($I_2$) of 0.50 g/10 minutes to 6.0 g/10 minutes, and a zero shear viscosity ratio of less than 2.0.

5. The multilayer film of claim 1, wherein an outer layer of the film comprises a third polyethylene composition, the third polyethylene composition comprising:
   (a) a first polyethylene fraction comprising at least one peak in a temperature range of from 35° C. to 70° C. in an elution profile via improved comonomer composition distribution (iCCD) analysis method, wherein a first polyethylene area fraction is an area in the elution profile from 35° C. to 70° C., and wherein the first polyethylene fraction area comprises from 25% to 65% of the total area of the elution profile;
   (b) a second polyethylene fraction comprising at least one peak in a temperature range of from 85° C. to 120° C. in the elution profile via iCCD analysis method, wherein a second polyethylene area fraction is an area in the elution profile from 85° C. to 120° C., and wherein the second polyethylene fraction area comprises at least 20% of the total area of the elution profile; and
   (c) a third polyethylene fraction in a temperature range of from 70° C. to 85° C. in the elution profile via iCCD analysis method, wherein the third polyethylene area fraction is an area in the elution profile from 70° C. to 85° C., and wherein the third polyethylene fraction area comprises less than 10% of the total area of the elution profile; and
   wherein the third polyethylene composition has a density of 0.880 g/cm$^3$ to 0.910 g/cm$^3$, a melt index ($I_2$) of 0.50 g/10 minutes to 6.0 g/10 minutes, and a zero shear viscosity ratio of less than 2.0; wherein the first polyethylene composition and the second polyethylene composition are in different layers of the film, and wherein the layer comprising the second polyethylene composition is between the outer layer comprising the third polyethylene composition and the layer comprising the first polyethylene composition.

6. The multilayer film of claim 1, wherein at least one layer further comprises linear low density polyethylene, low density polyethylene, or a combination thereof.

7. An article comprising the multilayer film according to claim 1.

* * * * *